(12) United States Patent
Santilli

(10) Patent No.: US 6,540,966 B1
(45) Date of Patent: Apr. 1, 2003

(54) APPARATUS AND METHOD FOR RECYCLING CONTAMINATED LIQUIDS

(75) Inventor: Ruggero Maria Santilli, Palm Harbor, FL (US)

(73) Assignee: Hadronic Press Inc., Palm Harbor, FL (US)

( * ) Notice: Subject to any disclaimer, the term of this patent is extended or adjusted under 35 U.S.C. 154(b) by 0 days.

(21) Appl. No.: 09/586,926

(22) Filed: Jun. 5, 2000

Related U.S. Application Data

(63) Continuation-in-part of application No. 09/372,278, filed on Aug. 11, 1999, now abandoned, and a continuation-in-part of application No. 09/133,348, filed on Aug. 13, 1998, now abandoned, and a continuation-in-part of application No. 09/106,170, filed on Jun. 29, 1998, now abandoned.

(51) Int. Cl.[7] ............................................... B01J 19/08
(52) U.S. Cl. ........................... 422/186.21; 422/186.22; 422/186.23; 422/186.26; 422/186.27; 204/164; 204/165; 204/168
(58) Field of Search ........................ 422/186.21, 186.22, 422/186.23, 186.26, 186.27; 204/164, 168, 165

(56) References Cited

U.S. PATENT DOCUMENTS

| | | | | |
|---|---|---|---|---|
| 603,058 A | | 4/1898 | Eldridge et al. | |
| 3,992,277 A | * | 11/1976 | Trieschmann et al. | ...... 204/172 |
| 4,054,513 A | * | 10/1977 | Windle | ........................ 209/214 |
| 4,229,307 A | * | 10/1980 | Lowe et al. | ................. 250/543 |
| 4,369,102 A | * | 1/1983 | Galluzzo et al. | .......... 204/228.1 |
| 5,026,484 A | * | 6/1991 | Juvan | ......................... 210/717 |
| 5,069,765 A | * | 12/1991 | Lewis | ........................ 204/173 |
| 5,159,900 A | | 11/1992 | Dammann | |
| 5,319,176 A | * | 6/1994 | Alvi et al. | ............. 219/121.59 |
| 5,417,817 A | | 5/1995 | Dammann et al. | |
| 5,435,274 A | | 7/1995 | Richardson, Jr. | |
| 5,692,459 A | | 12/1997 | Richardson, Jr. | |
| 5,792,325 A | | 8/1998 | Richardson, Jr. | |
| 5,826,548 A | * | 10/1998 | Richardson, Jr. | ............... 123/3 |
| 6,113,748 A | * | 9/2000 | Richardson, Jr. | ........... 204/170 |
| 6,183,604 B1 | * | 2/2001 | Santilli | ........................ 204/172 |
| 6,299,656 B1 | * | 10/2001 | Richardson, Jr. et al. | ..... 44/603 |

OTHER PUBLICATIONS

David Braaten, 'Ridiculously' easy test yields claim of energy triumph, The Washington Times, p. A5, Mar. 1989.*
Wada et al., Nuclear Fusion in Solid, Japanese Journal of Applied Physics, vol. 28, No. 11, p. L2017–L2020, Nov. 1990.*
Kim, Neutron Burst From a High–Voltage Discharge Between Palladium Electrodes in D2(sub) Gas, Fusion Technology, vol. 18, p. 680–681, Dec. 1990.*
Foundations of Hadronic Chemistry with Applications to New Clean Energies and Fuels by Ruggero Maria Santilli, (Date Unknown).

* cited by examiner

*Primary Examiner*—Alan Diamond
(74) *Attorney, Agent, or Firm*—Dennis G. LaPointe; Mason Law, P.A.

(57) ABSTRACT

Reactors for the total recycling of contaminated liquid waste, which produce a clean burning combustible gas, usable heat, and solid precipitates. Different embodiments include the efficient recycling of automotive antifreeze and oil waste, a new method for the production of a fuel from crude oil, for desalting seawater and for recycling biologically contaminated liquid waste, such as town sewage, into a clean burning combustible gas, nutrient rich water useful for irrigation, and solid precipitates useful for fertilizers.

62 Claims, 12 Drawing Sheets

APPARATUS AND METHOD FOR RECYCLING CONTAMINATED LIQUIDS

RELATED APPLICATION

This Patent Application is a continuation-in-part of U.S. patent application Ser. No. 09/372,278, filed Aug. 11, 1999 now abandoned, and is a continuation-in-part of the U.S. patent application Ser. No. 09/133,348, filed Aug. 13, 1998, now abandoned, and is a continuation-in-part of the U.S. patent application Ser. No. 09/106,170, filed on Jun. 29, 1998, now abandoned.

BACKGROUND OF THE INVENTION

The present invention is dramatically more efficient than those disclosed in prior art, such as U.S. Pat. Nos. 603,058 to H. Eldridge; 5,159,900 to W. A. Dammann and D. Wallman; 5,435,274 to W. H. Richardson, Jr.; 5,417,817 to W. A. Dammann and D. Wailman; 5,692,459 to W. H. Richardson, Jr.; 5,792,325 to W. H. Richardson, Jr.

The processes as per the latter prior art patents have the following main drawbacks which have prevented their being suitable for industrial and consumer applications: 1) the gas produced is environmentally unacceptable, because, according to numerous measurements, its exhaust contains 4% to 8% more carbon dioxide than fossil fuel exhaust; and 2) the gas produced is industrially unacceptable, because, also according to various measurements, its production rate is excessively slow due to the burning by the arc of the hydrogen and oxygen back to water, as illustrated by the typical large glow of underwater arcs.

SUMMARY OF THE INVENTION

This invention includes: a new process for flowing the liquid waste through electric arcs; equipment and process for the total recycling of liquid waste which cannot be even partially disposed in the environment, into a usable clean burning gas, a usable large source of heat, and solid precipitates usable for industrial applications; equipment and process for recycling biologically contaminated liquid waste, such as town, municipal, farm, industrial or consumer sewage, for the production of usable combustible gas, nutrient rich water usable for irrigation, and solid precipitates usable as fertilizers.

Car dealers, automotive service stations, municipalities, industries, farms, and any other entity releasing liquid waste are turned by this invention into a producer of clean fuel via an equipment which has essentially the dimension of a desk.

Water is known to be one of the best electric insulators. Yet, under an electric arc, the resistance of water collapses to values of the order of fractional Ohms, which low value of the resistance further decrease with the increase of the Kwh. It is evident that, under these conditions, the electric arc within water is one of the best known superconducting conditions at high temperature.

In fact, the flow of the liquid waste to be recycled through the electric arc, pushes a plasma created by the energized arc away from the arc on a continuous basis. Following the displacement of said plasma from the immediate vicinity of the electrodes tips, estimated to be a displacement of the order of ⅛", the plasma instantly cools down because the surrounding liquid is relatively very cold, implying a transition from 7,000 degrees F. to about 200 degrees F.

The present invention provides equipment and processes for producing a clean burning combustible gas and further provides heat energy from the large amount of heat acquired by the liquid, which can be captured and utilized with heat exchangers, radiators and other means known in the art.

For the case of the separation of the water via the PlasmaArcFlow Reactor with carbon anode, the cooled down plasma is formed by atoms of hydrogen, oxygen and carbon. Due to the much bigger affinity of carbon and oxygen, as compared to those of hydrogen and oxygen or hydrogen and carbon, the carbon instantly removes all available oxygen by forming the combustible gas CO. The PlasmaArcFlow then prevents CO to be oxidized by the electric arc into CO2. When the impurity in the water and in the carbon rod is ignorable, and under the maximal possible use of the PlasmaArcFlow, the resulting combustible gas is composed of a mixture essentially 50% of H2 and 50% CO, by volume. For the total recycling of liquid waste of fossil fuel origin, such as automotive antifreeze and oil waste, the principal constituents of the produced combustible gas remain H2 and CO, although in different proportions, such as 40% H2, 50% CO, 5% O2 and the remaining components being inert gases. Alternatively, the principal constituents of the produced combustible gas are about 40% H2, about 55% CO, about 3% CO2, and about 2% O2.

The combustion exhaust of the produced combustible gas from pure water composed 50% of H2 and 50% CO is therefore made of water vapor in approximately 60%, 20% carbon in solid form, 4% to 6% CO2, the balance being given by atmospheric gases, including nitrogen and possible impurities. In this way, the exhaust has no carcinogenic or other toxic substances, contains from ½ to ⅓ the CO2 of fossil fuel exhaust, and the oxygen consumption is dramatically less than the alarming oxygen depletion caused by the combustion of fossil fuels, currently running at the equivalent of about 72 million of oil barrels per day.

The exhaust of the combustible gas produced by the recycling of contaminated liquid waste is considerably better than that from the separation of the water, due to the larger O2 content. In fact, the exhaust is given by about 50% water vapor, 20% carbon in solid form, 15% oxygen, 4% to 6% CO2, and the rest is given by atmospheric gases. Alternatively, the exhaust can be about 60% water vapor, about 15% oxygen, about 15% carbon in solid form, about 5% CO2, and the rest, being general atmospheric gases.

In conclusion, the combustible gas produced by the invention herein is an environmentally best available fuel, which can be used in any application currently served by fossil fuels, including metal cutting, heating, cooking, automotive and truck uses.

As also indicated earlier, the heat produced by the inventive apparatus and process is acquired by the liquid waste during its recirculating flow through the electric arc, and can be utilized by separately flowing said liquid waste in an outside radiator, heat exchanger, or other conventional utilization of heat. For this reason, apparatus according to this invention generally have two different and independent recirculating systems individually served by pumps, one for the flowing of the liquid waste through the electric arc, and a separate one for the flowing of the same liquid waste through an outside heat utilization system.

Extensive experimentation and tests have established that the inventive systems are more effective operationally when the liquid waste is hot as compared to the same operation when the liquid waste is kept cold. Therefore, the system is operated at a minimal temperature of the liquid waste which depends on the desired application.

When operating at atmospheric pressure, the present invention for the total recycling of liquid waste is run at a constant liquid waste temperature of about 180 degrees F., while all heat in excess of that temperature is utilized with said external systems. In this case, the inventive system can be used as heaters of rooms or of buildings either via radiators with fans directly connected to the reactors as indicated above, or via the use of the equipment to heat up water via heat exchangers which hot water is then pumped through conventional heaters in individual rooms.

This invention can also be used to produce steam. This application is achieved by operating the system at pressures of 15 to 20 psi for the recycling of liquid waste such as automotive antifreeze or oil waste, in which case said liquid waste can be kept at the minimal temperature of 400 degrees F. without boiling, while dissipating via a heat exchanger all heat in excess of said temperature. Since, under the above conditions, the heat exchanger operates at a temperature bigger than the boiling temperature of water, the system can indeed produce steam in a continuous basis.

When the system is operated at atmospheric level, the production of the combustible gas is almost explosive since we have the conversion of one unit of volume of the liquid into about 1,800 units of volume of the gas, as per established knowledge in the transition of state from liquids to gas. It then follows that the production of the gas displaces the liquids, and the arc occurs for about 60% of the time within the gas, rather than within the liquid.

The increase of the pressure in the vessel implies the corresponding proportional decrease of the size of the bubbles of the gas produced, with corresponding increase of the period of time the arc occurs within the liquid. As illustrations, the operation of the equipment at 20 psi implies the decrease of the size of the gas bubbles of at least one tenth, while an operating pressure of 200 psi is expected to imply a reduction of the gas bubbles of the order of $1/100$th.

The volume of gas produced is directly proportional to the gap between the electrodes. Unlike the case of electric arcs in air, the gap of electric arcs within liquids can be appreciably increased only with the increase of the Kwh.

Further, an operator can increase the flow of the liquid through the arc. In fact, the faster the flow of the liquid through the arc, the bigger the volume of the combustible gas produced. Also, the large glow of underwater arcs originates from the burning of hydrogen and oxygen back to water immediately following their creation, as triggered by the arc itself. For the case of stationary arcs within water according to the prior art patents quoted earlier, about 80% of the gases produced by the arcs burn back to water. The present invention reduces such a waste It should be stressed that, for a number of technical or practical limitations, it is impossible to utilize with current technology all the energies produced by electric arcs within liquids. The first limitation is the impossibility to utilize all the gases produced by said under liquid arcs, because the increases of the flow beyond a threshold value for each given electric energy extinguishes the arc itself. Additional limitations are due to the known impossibility to increase the electrodes gap for a given value of the electric energy, the lack of availability of conductors practically usable as electrodes for very large electric energies, and other factors.

The systems or apparatus described above have been built by this inventor according to the specifications further described below, which are completely automatic, including the automatic initiation, control and optimization of the electric arc, and the automatic reloading of the consumable carbon rods. Particular care has been devoted to the conception and construction of systems to minimize waste of electric energy when propagating in electrodes of low conductivity, such as carbon electrodes. This can be achieved via copper cables of large current capacity delivering the electric current to copper bushing sliding under pressure on the carbon rods at a position as near as practically possible to the electric arc.

In summary, this invention establishes the achievement with current technology of a system served by 300 Kwh, operating at 200 psi, with a PlasmaArcFlow of about 3000 g/h, and the recycling of liquid waste of fossil origin kept at the constant temperature of 400 degrees F. via a heat exchanger. Alternatively, the invention provides new means for the production of steam. In turn, the availability of steam permits revolutionary new applications, such as the production of electric energy via steam-driven conventional electric generators, or the desalting of sea water via conventional evaporating means.

Additional novel applications are the following. First, the invention is particularly suited to produce a clean burning combustible fuel from crude oil in a way which is environmentally, logistically, and financially more advantageous than currently used refineries. The environmental advantages are evident from the preceding analysis. The logistic advantages are also evident because, refineries notoriously require large area, thus requiring the oil to be shipped to them, while the present invention is light and mobile, and can therefore be shipped directly to the oil well.

Yet another important application is the use of sea water as liquid to be processed within the equipment. In this case the gas produced has high energy content due to the various elements in the sea water, and the heat acquired by the liquid is consequently high. The invention working on sea water can then be used for a variety of.applications, including a new method of desalting sea water via steam obtained through heat exchanges.

Another application of the above invention is in the recycling of dense liquid waste of animal origin. In fact, the liquid waste can be recirculated through the electric arc until all bacteria are eliminated, as well as until that point in which all bacteriological contaminants are based, thus no longer in solution in the water, at which point the contaminants can be removed with a centrifuge or a filter. This application produces an excellent, clean burning combustible fuel, heat acquired by the liquid waste, solid precipitates usable for fertilizers, and residual water good for irrigation.

Still another application of the invention is that for the complete recycling of paints, paints residues, heavy industrial waste, and other wastes.

The above description refers to total recyclers, that is, equipment for the complete recycling of liquid waste which cannot be disposed in the environment not even in part.

A second class of recyclers permitted by this invention is that for the partial recycling of liquid waste, that is, the removal of contaminants for the production of a usable final liquid. A representative application among several possible ones is that for the recycling of biologically contaminated waters, such as city, town, farms, industrial or consumer sewage, into: 1) clean burning gas; 2) solid precipitates useful for fertilizers; and 3) nutrients rich water usable for irrigation. The latter systems are also called linear recyclers, to denote the single passage of the liquid waste though the arc without recirculation.

The main aspects of this new recycling process is the following. Thanks to the use of a venturi as per FIG. 1B which is further described below, the sewage is forced to pass through the immediate vicinity of the incandescent electrode tips, thus being exposed to a temperature of about 7,000 degrees F., the extremely intense light of the electric arc; electric current of 1,000 A and more, the very strong electric and magnetic fields associated to said electric current, and other factors. These combined conditions eliminate any bacteria in the original sewage by therefore rendering the liquid sterile. Jointly, the original organic substances are partially decomposed into volatile and solid substances, and partially baked into sterile, nutrient rich substances in solution or suspension in the water. The degree of purity of the final water suitable for irrigation is then turned into technical features suitable to meet the requirement by environmental regulatory agencies, including appropriate filtering, if requested.

It should he stressed that, as far as farmers are concerned, there is the clear need of reducing filtration at an absolute minimum, evidently upon achieving complete sterilization of the original biological contaminants. In fact, the elimination of nutrient rich substances produced by the linear reactor implies the requirement that farmers have to purchase instead chemical fertilizers, which are environmentally much less desirable, besides being more expensive. At any rate, an important advantage of the sewage recycling by this invention is that the nutrient rich waters suitable for irrigation qualify for organic produce, thus permitting crops of higher quality, since the original biocontaminants are of human or animal origin.

Extensive tests and experimentation, as well as chemical analyses conducted by independent laboratories, have established the capability by a linear reactor powered by 50 Kwh to render sterile liquid sewage with about 5% biological contaminants at the rate of about 1,000 g/h. A complete recycling station contemplates the use of a minimum of three reactors put in series with individual bypasses, so as to permit the servicing of one station while the other two are operational. In this way, the linear recycler has one primary reactor for the sterilization of the biological contaminants, plus one second identical station as a safety backup, the third station being useful to further refine the final irrigation water.

In the event that more than 1,000 g/h are needed, the above described three linear reactors can be put in parallel in any desired numbers. The increase of the electric power over 50 Kwh also permits an increase of the flow of recycled sewage. In this way, this invention permits the recycling of small flow of sewage of the order of 1,000 g/h or very large flow of the order of 1,000,000 g/h via a suitable combination of linear reactors in series, for the desired quality of the final irrigation water, as well as in parallel, for the desired flow of recycling, under an electric power per station which can be computed depending on the desired flow.

It should be noted that the biological contaminants present in city sewage generally are of the order of 5%, as indicated above. Very heavy sewage as available in farms can also be recycled with the technology of this invention in a two-fold way. First, by processing them without dilution in the total recyclers of FIGS. 1A, 1B, 1C, 2A, 2B, 2C, 2D, 2E, 3, and 4, that is, by recirculating them until all biological contaminants are recycled and the liquid is sterilized. Second, the same dense liquid sewage can be recycled with the linear reactor of FIG. 5 following dilution of their concentration with tap water, and/or increase of electric power delivered to the arc proportionate to the increase of the contaminants percentage.

The advantages of the above novel sewage recycling process over recycling processes currently used in cities and municipalities are dramatic. There is the dramatic advantage of eliminating all the malevolent odors which are typically near current sewage recycling plants, since the recycling process is completely internal with no outlet other than sterile and odorless irrigation water. The large sedimentation areas needed by current sewage treatment plants, and generally located in prime land, are eliminated, thus permitting the urban use of said large sedimentation areas, also in view of the elimination of the odor. There is no longer any need to bring the entire sewage of a city to a single collection area, due to the smallness of the linear recycler, which have essentially the size of a desk when powered by 50 Kwh, thus permitting the location of several recycling stations throughout the city, with great advantages for the local availability of irrigation water, as well as for the elimination of the obnoxious sewage backups and overfills. When new villages are now built during the normal process of urban expansion, the first duty of cities and municipalities is that of spending millions of dollars to connect said new villages to the main sewage treatment plant. The latter large expenditures is completely eliminated, since the linear reactor of this invention can be placed anywhere, thus rendering said new village completely independent in regard to the sewage recycling and irrigation water. Along the same lines, the construction of houses or village at high elevation is prohibited now because of technical difficulties as well as the prohibitive cost of building a sewage connecting pipe going up to high elevation in a rocky soil, while the same village can now be built at a much smaller price, since the linear recycler can indeed work at any elevation.

In conclusion, this invention provides the very first, actually constructed, systems for the total recycling of liquids, whether contaminated liquid waste or ordinary fresh, well and sea water, or for the partial recycling of liquid sewage. The invention for the total recycling of liquids produces a combustible gas with the environmentally best available exhaust and heat usable via conventional heat exchangers. The invention for the recycling of biologically contaminated waters produces a clean burning combustible gas, nutrient rich water usable for irrigation, and solid precipitates usable for fertilizers.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE DRAWINGS

We present below the preferred embodiments of this invention in all possible construction details for the industrial realization of all features described above.

Figure 1A:
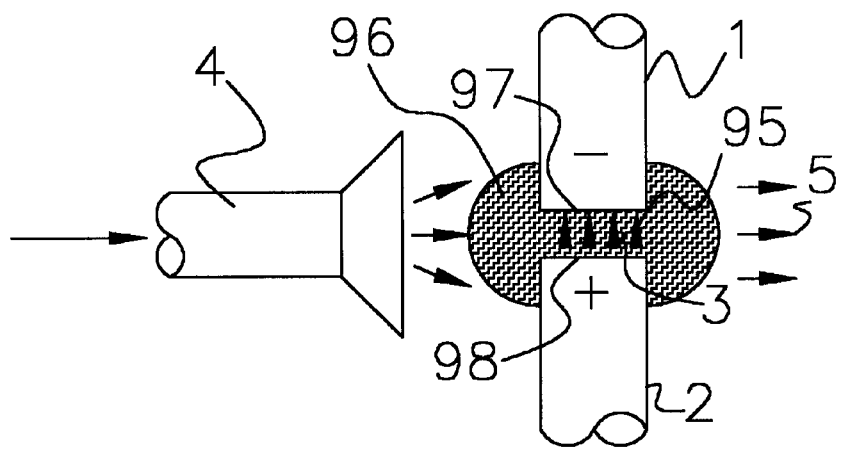
FIG. 1A depicts the PlasmaArcFlow process of the co-pending related U.S. patent application Ser. No. 09/372, 278.

Referring now to the drawings, FIG. 1A depicts the main principle of the PlasmaArcFlow of co-pending U.S. patent application Ser. No. 09/372,278, consisting of two electrodes 1,2 of about ¾" in diameter which are immersed within the liquid waste to be recycled shown in the subsequent embodiment of FIG. 2A, which liquid is contained in the interior of a metal vessel also shown in the subsequent embodiment of FIG. 2A. A DC electric arc 95 is made to occur in between the tip 97 of the anode 1 and the tip 98 of the cathode 2, the electrons moving from the positively charged tip 98 toward the negatively charged tip 97, said electric arc 95 being powered by a 50 Kwh DC power source (not shown in FIG. 1A for simplicity) with a gap 3 designating the distance between the tips 97,98 of the electrodes 1,2 which is generally of the order of 118" for a 50 Kwh DC power source. FIG. 1A also depicts the plasma 96 surrounding the tips 97,98 of the electrodes 1,2, which essentially consists of an area having the natural geometry of a spheroidal ellipsoid with semiaxes of about ½"×1/2"×1" created by the incandescent character of the tips 97,98 under the electric arc 95, and generally composed by a mixture of gaseous and liquids components at a temperature the of order of 7,000 degrees F. The recycling of the liquid waste occurs by flowing the liquid via a pump 36 forcing the liquid through pipe or tube 4 thus forcing the liquid to pass through the plasma 96 surrounding the tips of the electrodes 1,2 and through the electric arc 95 with gap 3, and then ending with the outlet flow 5. This embodiment constitutes the PlasmaArcFlow process which decomposes the molecules of the liquid to be recycled into gaseous and solid elements. The recombination of the gaseous elements into a combustible gas is controlled by the flow itself, while solids precipitate at the bottom of a reactor where they are periodically collected for industrial and other usages.

Figure 1B:
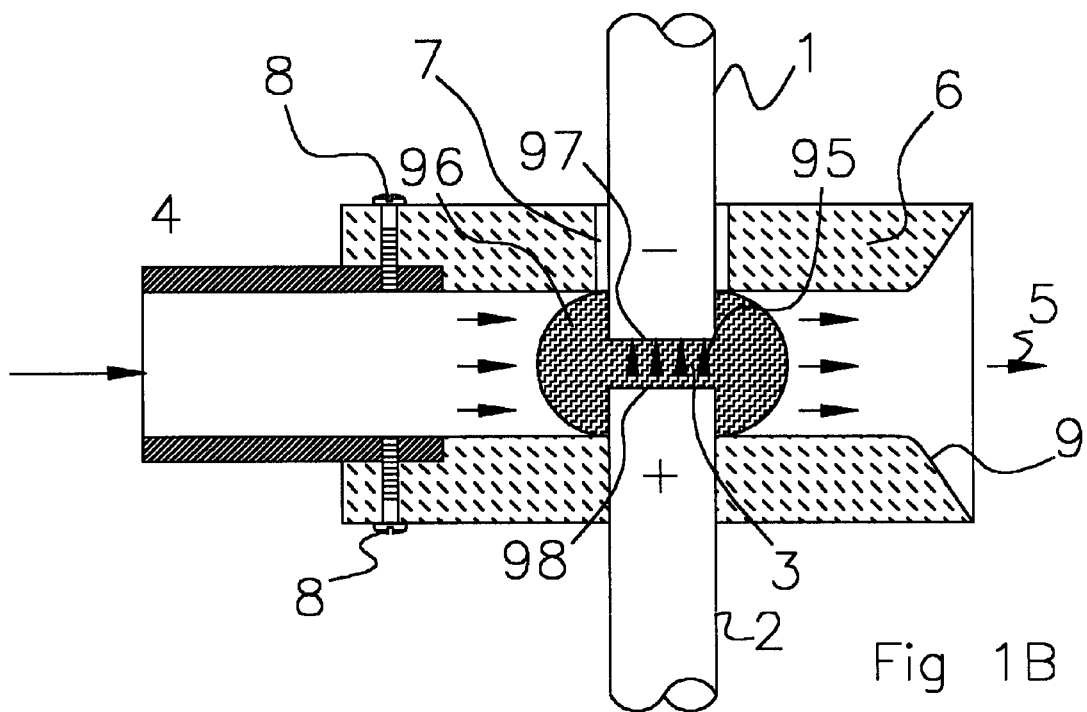
FIG. 1B depict a preferred embodiment of the improved PlasmaArcFlow of this invention, in which the liquid to be recycled flows first through the plasma surrounding the electric arc, and then through the electric arc itself.

A preferred embodiment of this invention, which constitute a substantial improvement of the proceeding one, is depicted in FIG. 1B, which comprises the same electrodes 1,2, related tips 97,98, related gap 3, the electric arc 95 through said gap 3, the plasma 96, and the 50 Kwh DC power unit of FIG. 1A. The main novelty is constituted by the fact that the tube 4 through which the liquid to be recycled is forced to move by a pump, ends in a tube 6 of insulating material, such as ceramic, hereinafter called venturi, which has the following main features: 1) the venturi 6 encompasses the tips 97,98 of the electrodes 1,2; 2) the venturi 6 has the approximate interior diameter of about 1" for electrodes with ¾" diameters, about 3" in outside diameter, and about 5" in length; 3) the venturi 6 has ¹⁄₁₆" clearance 7 for the electrodes 1,2 to move freely in and out the venturi 6; 4) the venturi 6 is locked into the tube 4 by fasteners, such as screws 8; and 5) the venturi 6 ends with a smooth curve 9 to minimize turbulences. After being forced to pass through said venturi 6, the liquid waste then exit with outlet flow 5.

The advantages of the PlasmaArcFlow embodiment of FIG. 1B over the embodiment of FIG. 1A are several, and include: 1) assurance that the entire liquid is exposed to the plasma 96 surrounding the tips 97,98 of the electrodes 1,2, which exposure is evidently absent for the embodiment of FIG. 1A; 2) assurance that the liquid to be recycled does indeed pass through the gap 3 of the electric arc 95 due to the evident back-up pressure created by the venturi 6, which assurance is also absent for the embodiment of FIG. 1A, particularly for the small gap distances occurring under small electric powers; and 3) dramatic increase of the efficiency in the recycling of the liquid waste, not only because of the preceding properties 1) and 2), but also because of the reduction of turbulences in the motion of the liquid.

In view of these advantages, the PlasmaArcFlow according to the venturi 6 of FIG. 1B permits practical application which are simply impossible for the PlasmaArcFlow of FIG 1A. One of them is the recycling of liquid waste, which attains full sterilization with one single pass when using the venturi 6 of FIG. 1B. In fact, for the case of FIG. 1B the entire liquid sewage is forced to pass through the plasma 96 having 7,000 degrees F., plus an extremely intense light, electric current of 1,000 A and more, very large electric and magnetic fields, all factors which assure the instantaneous termination of all bacteriological activities. By comparison, only part of the liquid sewage is exposed to all these factors when the PlasmaArcFlow of FIG. 1A is used, thus preventing its practical and industrial application for the case here considered.

Needless to say, proportionately larger interior diameters of the venturi 6 are needed for larger electrode diameters; the interior shape of the venturi 6 can have a variety of geometries, such as an ellipsoidal, rather than a cylindrical, sectional area; and the end shape of the venturi 6 can have a variety of different curves to minimize turbulences.

Figure 1C:
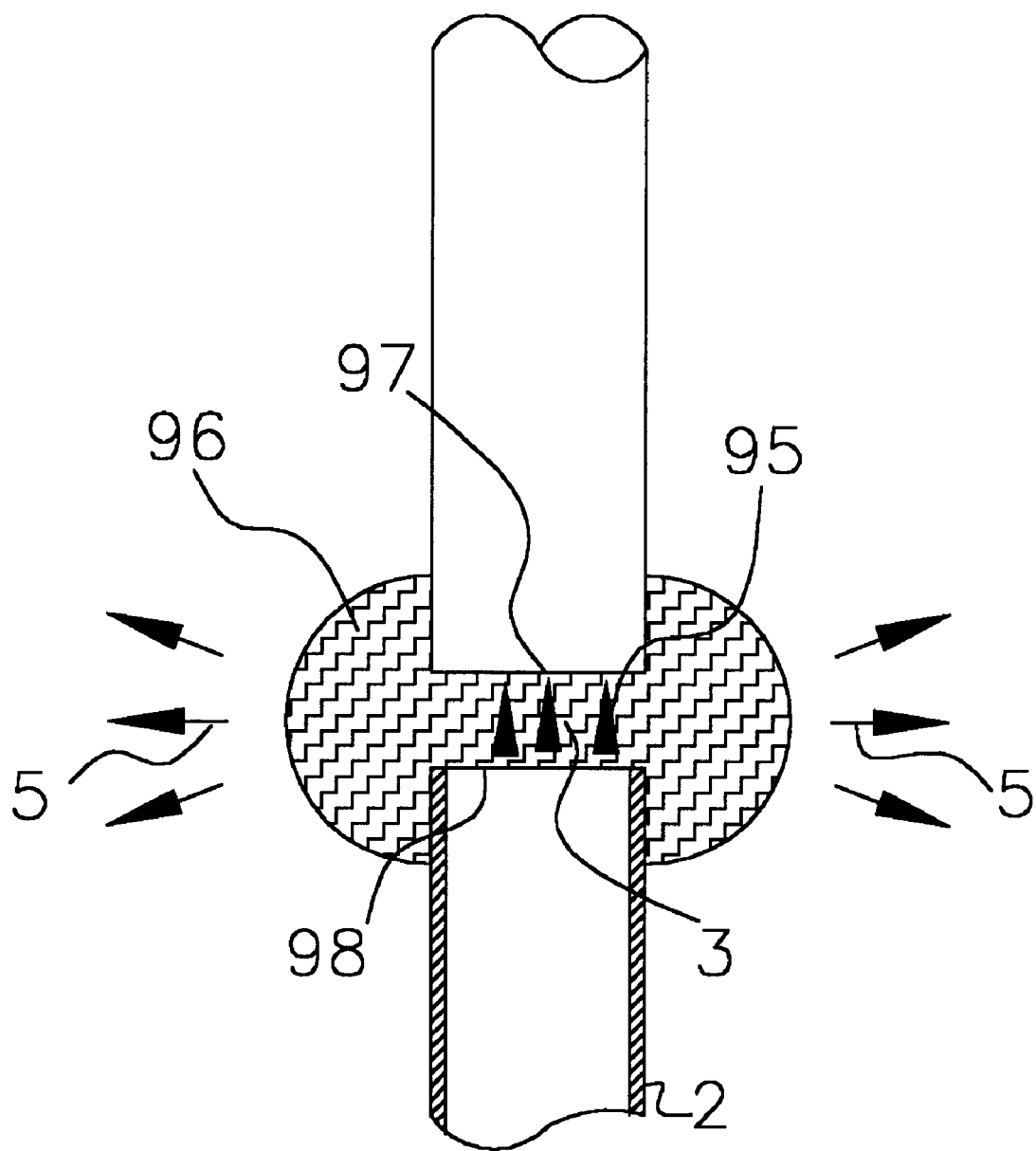
FIG. 1C depicts an alternative embodiment called ArcPlasmaFlow, in which the liquid to be recycled flows first through the electric arc, and then thru the plasma surrounding the latter.

FIG. 1C depicts an alternative embodiment, called ArcPlasmaFlow, comprising an anode 1 served by a conventional carbon rod of ¾" diameter and 12" length with end tip 97; a hollow cathode 2 of the approximate shape of a cylinder of ¾" outside diameter and ½" inside diameter with end tip 98, the gap 3 in between the tips 97,98 of the electrodes 1,2, the electric arc 95 in between said tips 97,98, and the plasma 96 surrounding the electrodes tips 97,98. The liquid to be recycled is flown through the interior of the cathode 2, by therefore being forced to pass first through the arc 95 and then through the plasma 96, resulting in this way in the indicated ArcPlasmaFlow process.

An improvement of the above embodiment is given by a hollow anode 1 with the same cylindrical dimensions of the cathode 2, although such a configuration is not necessary for carbon or coal rods because, even though being made of a solid rod acting on a hollow cylindrical cathode 2, such solid anode 1 is completely consumed by the electric arc 95 when attempting to penetrate within the hollow cathode irrespectively of whether said anode 1 is a solid rod or a hollow cylinder.

The ArcplasmaFlow of FIG. 1C is preferable over the PlasmaArcFlow of FIG. 1B in a number of cases where exposure of the liquid waste is needed first to the electric arc, e.g., to cause given chemical reactions and decomposition, prior to the passage of the same liquid waste through the plasma 96. The alternative ArcPlasmaFlow will be tacitly implied as applicable to all embodiments considered below, whenever needed.

Figure 1D:
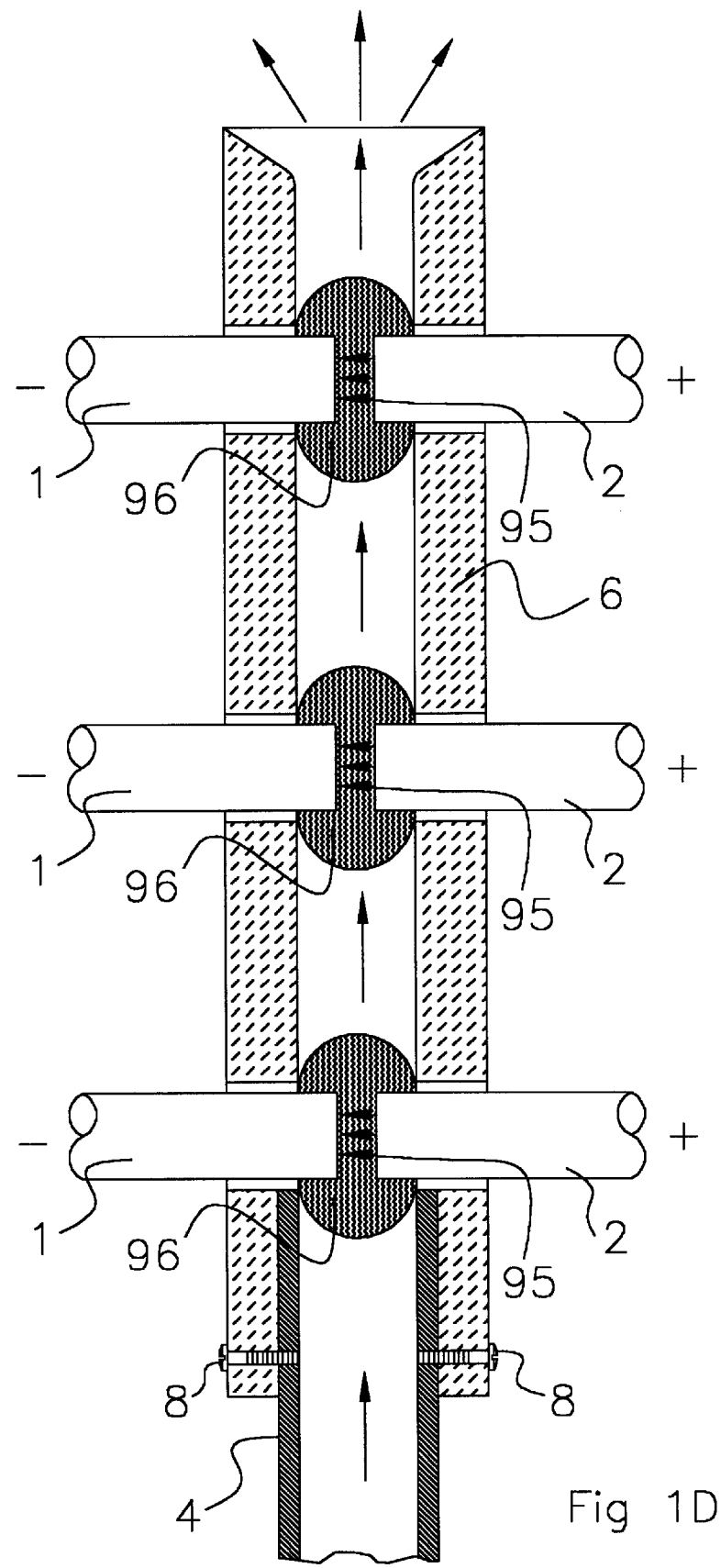
FIG. 1D depicts a systems of PlasmaArcFlows connected in series.

FIG. 1D depicts a representative case of three PlasmaArcFlows with the flow of the liquid waste connected in series. In this case the liquid waste flows through the one single inlet pipe 4, and then passes through a series of three plasmas 96 with the corresponding series of three electric arcs 95 all enclosed within the same venturi 6. This embodiment evidently implies a three-fold increase of the recycling processes of one single PlasmaArcFlow, while the flow remains the same as that of one single PlasmaArcFlow. It should be noted that, according to tests and experimentations, the electric arcs 95 can be powered in the following three different ways:

1) all three electric arcs are in series powered by one single DC electric generator, in which case the first negative polarity is connected to the electric generator, the first positive polarity is connected to the second negative polarity, the second plosive polarity is connected to the third negative polarity, and the final positive polarity is connected to the DC electric generator; 2) all three electric arcs are connected in parallel from one single DC electric generator, in which case all three negative polarity are individually connected to said generator, and all three positive polarities are individually connected to said electric generator; and 3) the electric arcs are individually powered by three different DC electric generators, one per each electric arc.

Figure 1E:
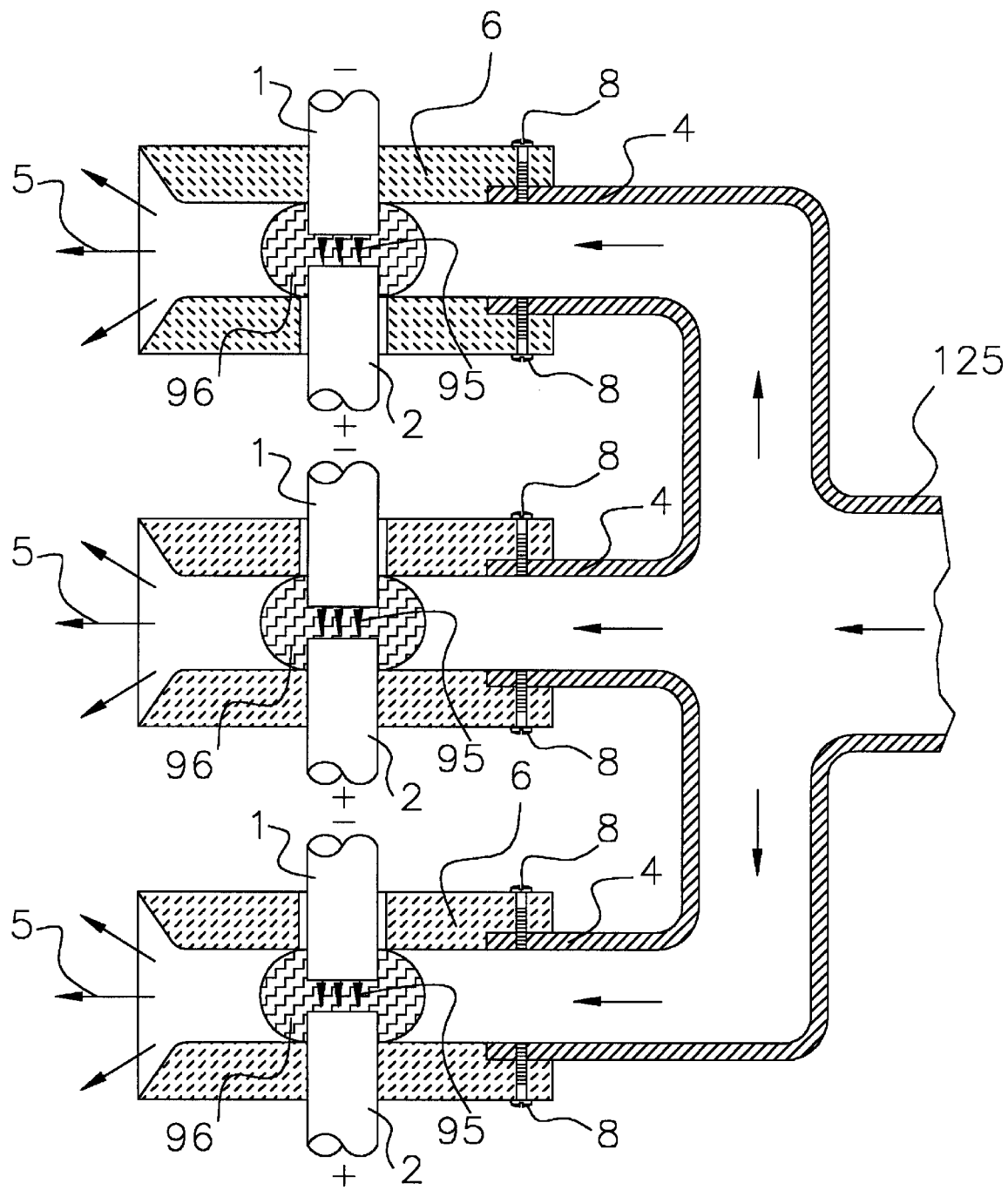
FIG. 1E depicts a system of PlasmaArcFlows connected in parallel.

FIG. 1E depicts a representative case of three PlasmaArcFlows with the flow of the liquid waste connected in parallel. In this case the liquid waste flows through the one single inlet pipe 125, which is then divided into three separate pipes 4, each one having its own venturi 6 encompassing the individual electric arcs 95 and plasmas 96. This embodiment evidently implies a three-fold increase of the recycling flow of one single PlasmaArcFlow, by keeping the 'same recycling processes of one PlasmaArcFlow. It should be noted that, according to tests and experimentations, the sequence of electric arcs 95 can be powered in the following three different ways: 1) all three electric arcs are in series powered by one single DC electric generator, in which case the first negative polarity is connected to the electric generator, the first positive polarity is connected to the second negative polarity, the second positive polarity is connected to the third negative polarity, and the final positive polarity is connected to the DC electric generator; 2) all three electric arcs are connected in parallel from one single DC electric generator, in which case all three negative polarity are individually connected to said generator, and all three positive polarities are individually connected to said electric generator; and 3) the electric arcs are individually powered by three different DC electric generators, one per each electric arc.

Figure 2A:
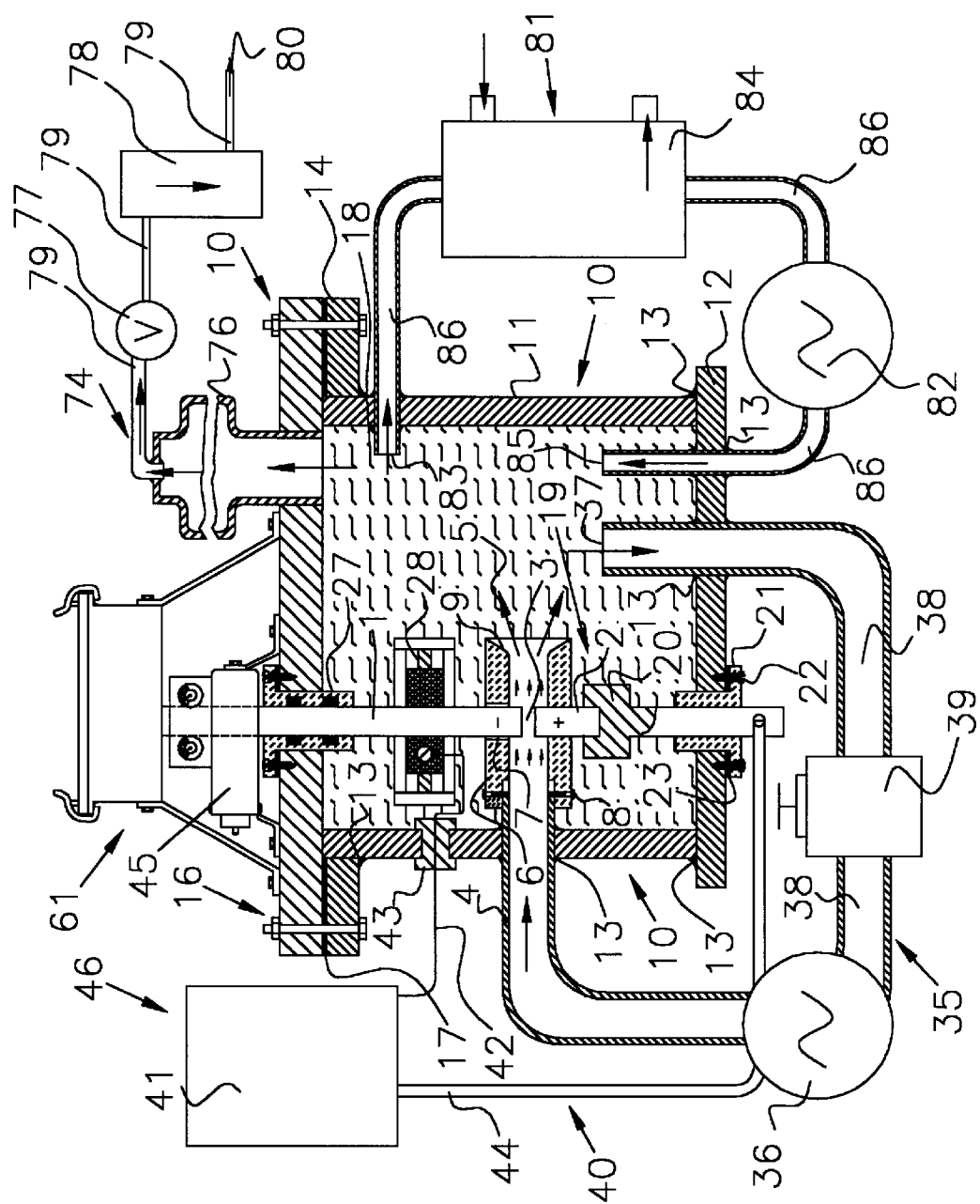
FIG. 2A depicts a preferred embodiment for the automatic PlasmaArcFlow Reactor of this invention for the total recycling of contaminated liquid waste.

FIGS. 2A, 2B, 2C, 2D, 2E depict preferred embodiments of the systems for the total recycling of liquid waste, or the decomposition of the water, which is based on the improved PlasmaArcFlow by the venturi 6 of FIG. 1B, and consists of the following main components. (NOTE: All dimensions provided are approximate and reflect a typical application of the invention only. Similarly, although stainless steel or steel may be mentioned below as a preferred material, other materials are contemplated.):

MAIN CLOSED VESSEL ASSEMBLY, as in FIG. 2A here collectively designated 10, comprising a stainless steel cylindrical sidewall 11 of about ¼" thickness, about 3' diameter and 1' height, with bottom base 12 consisting of a stainless steel flange of ½" thickness and 3' and 3" in outside diameter fastened to said tube 1 by welding 13 or other means, the vessel being completed by the stainless steel ring 14 of ½" thickness and 3' 3" in outside diameter fastened to said tube 1 by welding 13 or other means, plus a top 15 composed by a stainless steel disk of ½" in thickness and 3' and 3" in outside diameter, which is fastened into the flange 14 via bolts 16, while gasket 17 assures the complete sealing of the interior chamber under pressure, said main vessel 10 being completely filled up with about 15 g of liquid waste 18 to be recycled.

ELECTRODES ASSEMBLY, as in FIGS. 2A and 2B here, collectively denotes 19, comprising the vertically placed, stationary, nonconsuming cathode 2 composed by a tungsten rod of about 2" in outside diameter and about 3" in length, houses into a copper holder 20 which protrudes below and outside the base 12 of the vessel and it is insulated electrically from the latter by the nonconducting bushing 21 made of phenolic or other nonconducting material, fastened to the base 12 with screws 22 with interplaced gasket 23 for complete sealing under pressure, said bushing 21 having the shape and dimension so as to allow no distance less than 1" between the cathode holder 20, and the metal base 12; plus a consumable anode 1 composed by a ¾ commercially available, carbon rods of 12" in length, which are interlocking for continuous use, and which penetrates into the main metal vessel assembly 10 vertically from the top IS through bushing 24 having fastened to top 15 via screws 25 with interlocking gasket 26 and seals 27 to ensure containing the pressure inside the vessel, as well as to prevent leaks of the liquid waste 18 to the outside, said carbon rod passing through a contact assembly 28 for the delivery of the negative polarity of the electric current to the anode 1, more particularly described in FIG. 2B, with reference to which the assembly comprises two copper contacts 29 of approximately 2" in length measured along the axis of anode 1, 1" in thickness, and 1" in width, which are permitted to slide inside an encompassing copper box 30 of about ¼ in thickness which forces said copper contacts 29 against said carbon rod 1 via springs 31, the copper contacts 29 being held in location by respective shafts 32 sliding inside the encompassing casing 30 through 1/32 clearance 33, the negative polarity of the electric current being delivered to the sliding contacts 29 via the high current wires 34 and related locks.

PLASMA-ARC-FLOW ASSEMBLY, as per FIG. 2A here collectively denoted 35, consisting of the assembly as per FIG. 1B, with venturi 6 encompassing the tip of the electrodes 1,2, a recirculating 1 HP pump 36 which forces the liquid waste 18 through said venturi 6, with an inlet 37 originating inside the main vessel assembly 10, the assembly being served by standard, pressure resistant, steel pipes 38 of 1" in inside diameter with permanent, pressure resistant fastening to said vessel 10 via welding 13 or other means, said PlasmaArcFlow assembly further comprising a commercially available trap 39 with interior filter and bypasses (not shown here for simplicity) for the removal of solid precipitates without halting operations.

Figure 2B:
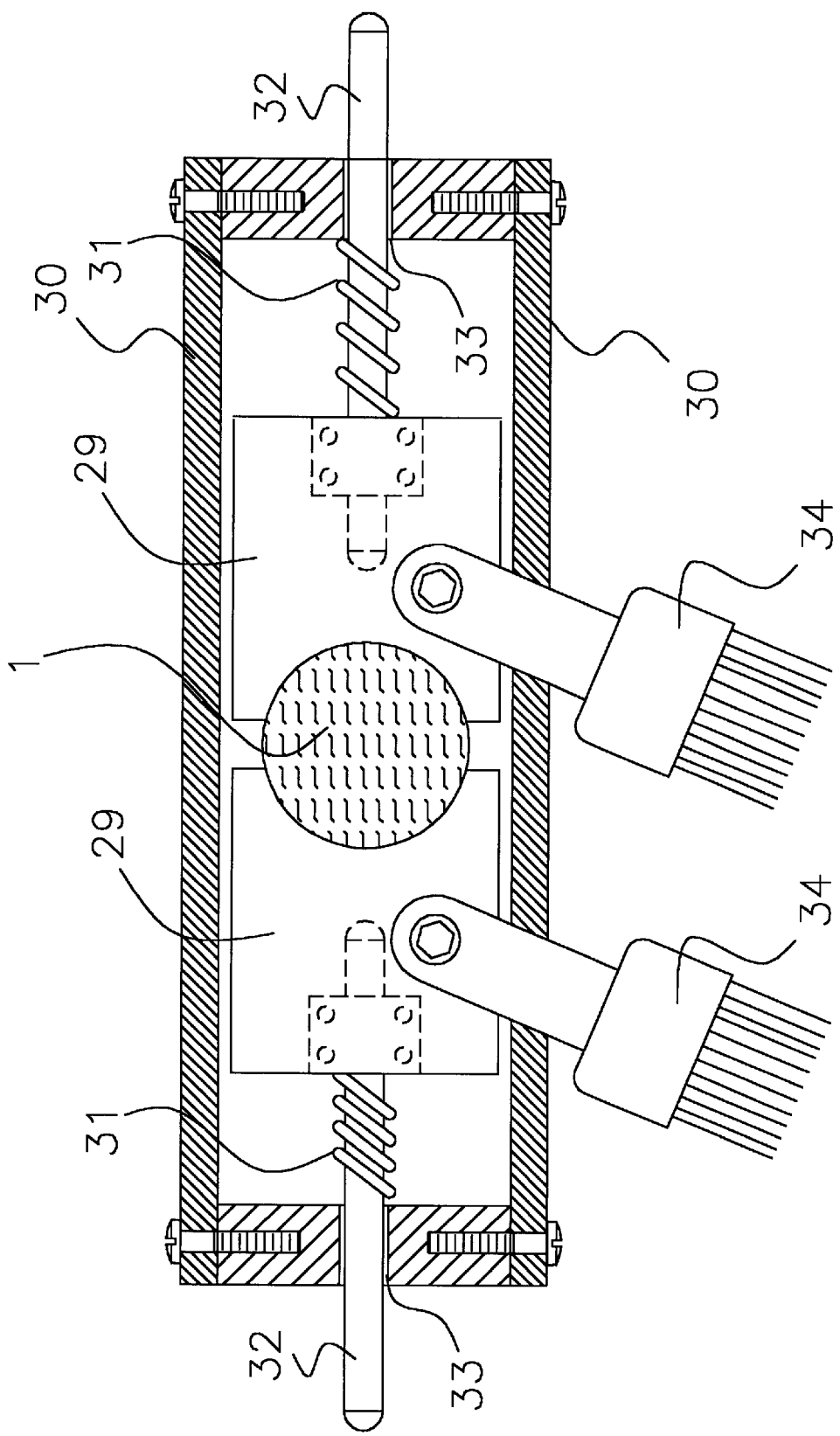
FIG. 2B depicts submerged copper contacts delivering the negative polarity of the electric current to the anode as closed as possible to the electric arc to minimize losses.

ELECTRIC POWER ASSEMBLY, as per FIG. 2A here collectively denotes 40, consisting of a 50 DC electric generator 41, such as the commercially available Dimension 1000 made in the U.S.A. by Miller Corporation, with high current copper cable 42 to deliver the negative polarity to the contact assembly of FIG. 2B while passing through the main vessel assembly 10 by means of pressure resistant fitting 43, the high current copper cable 44 for the delivery of the positive polarity to the cathode holder 20 protruding below and outside the base 12 of the main vessel assembly 10.

Figure 2C:
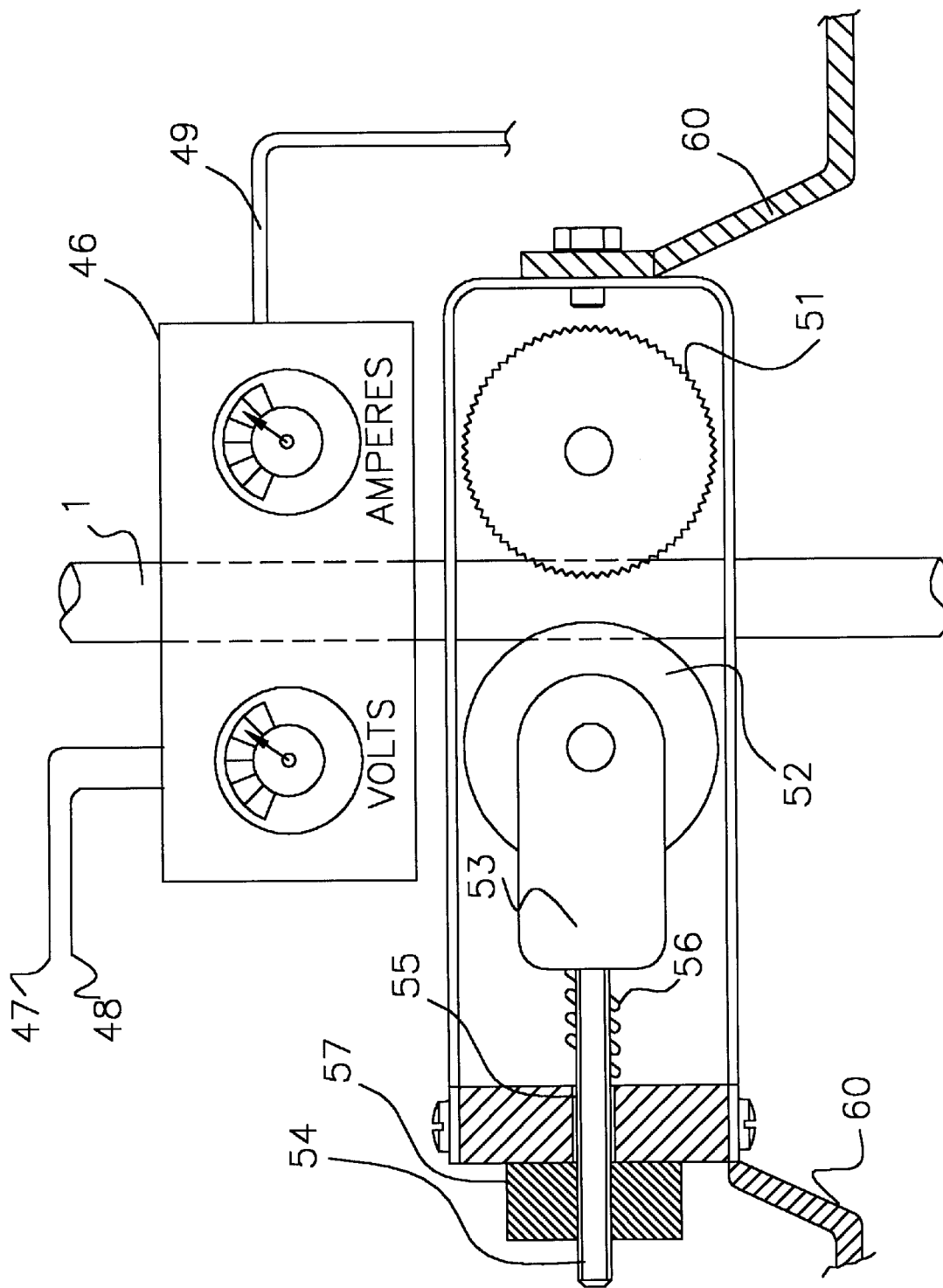
FIGS. 2C and 2D provide different views of the automatic control of the electric arc.
Figure 2D:
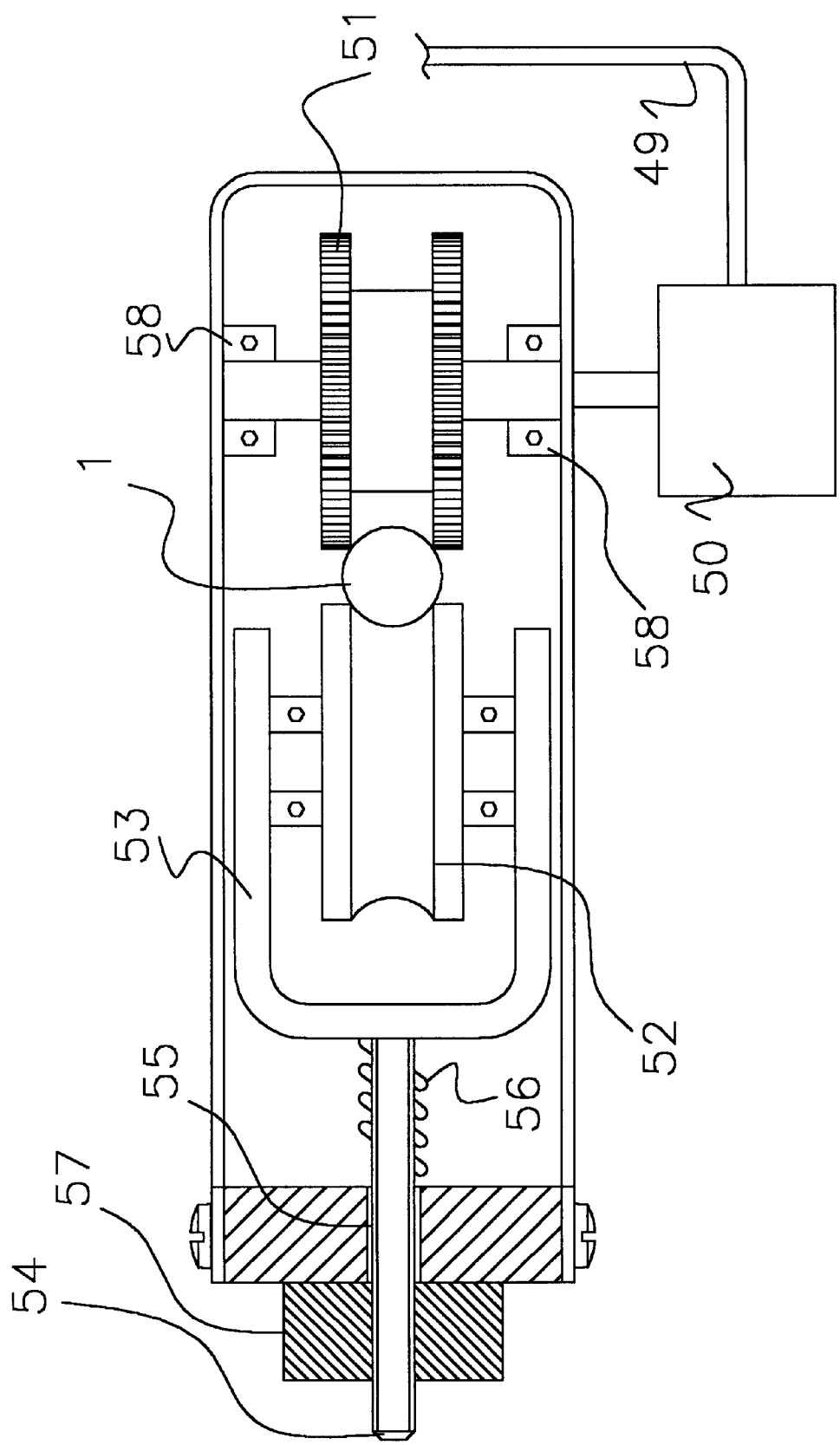

AUTOMATIC ARC FEEDING ASSEMBLY, as per FIG. 2A, here collectively denoted 45, more particularly described in FIGS. 2C, 2D, with reference to which said assembly comprising commercially available electronic equipment 46 for the initiation, control and optimization of the arc, such as model NP6000 produced and sold in the U. S. A. by ArcAir, a division of Tweeco Corporation, with electronic sensors every 50 milliseconds of the voltage of the electric arc via wire 47 connected to the cathode 2 and wire 48 connected to the contacts 29 of FIG. 2B or to the ground, depending on the available model, said electronic equipment then sending an impulse electric current through wires 49 to the ½ HP electric motor 50 which operates a pair of sharply teethed gears 51 in tempered steel of ⅛" in thickness, 3" in outside diameter and spaced ⅜" for a ¾" carbon rod; toothed gears 51 penetrate within the carbon rod 1 for about ⅛" for proper grip thanks to the idle counter-roller 52 of about 3" in outside diameter, ¾" in thickness and a circular depression in its cylindrical exterior to house and maintain the location of the carbon rod anode 1, said idle roller 52 being made of insulating hard material such as ceramic and being housed in a u-shaped holder 53 ending with a threaded shaft 54 which penetrates through the housing with a ¹⁄₃₂" clearance 55, said idle roller 52 being forced against the carbon rod anode 1 and against the teethed gears 51 by spring 56, while said pressure can be removed for servicing via knob 57 acting on the threaded shaft 54, the teethed gear 51 being supported by ball bearings 58 located in the external housing for smooth operation, and, similarly, the idle roller 52 being supported by ball bearing 59 located in the U-shaped support 53, also for smooth operation, the entire assembly being supported by metal legs 60 for fastening into the metal top 15 of the main vessel assembly 10.

Figure 2E:
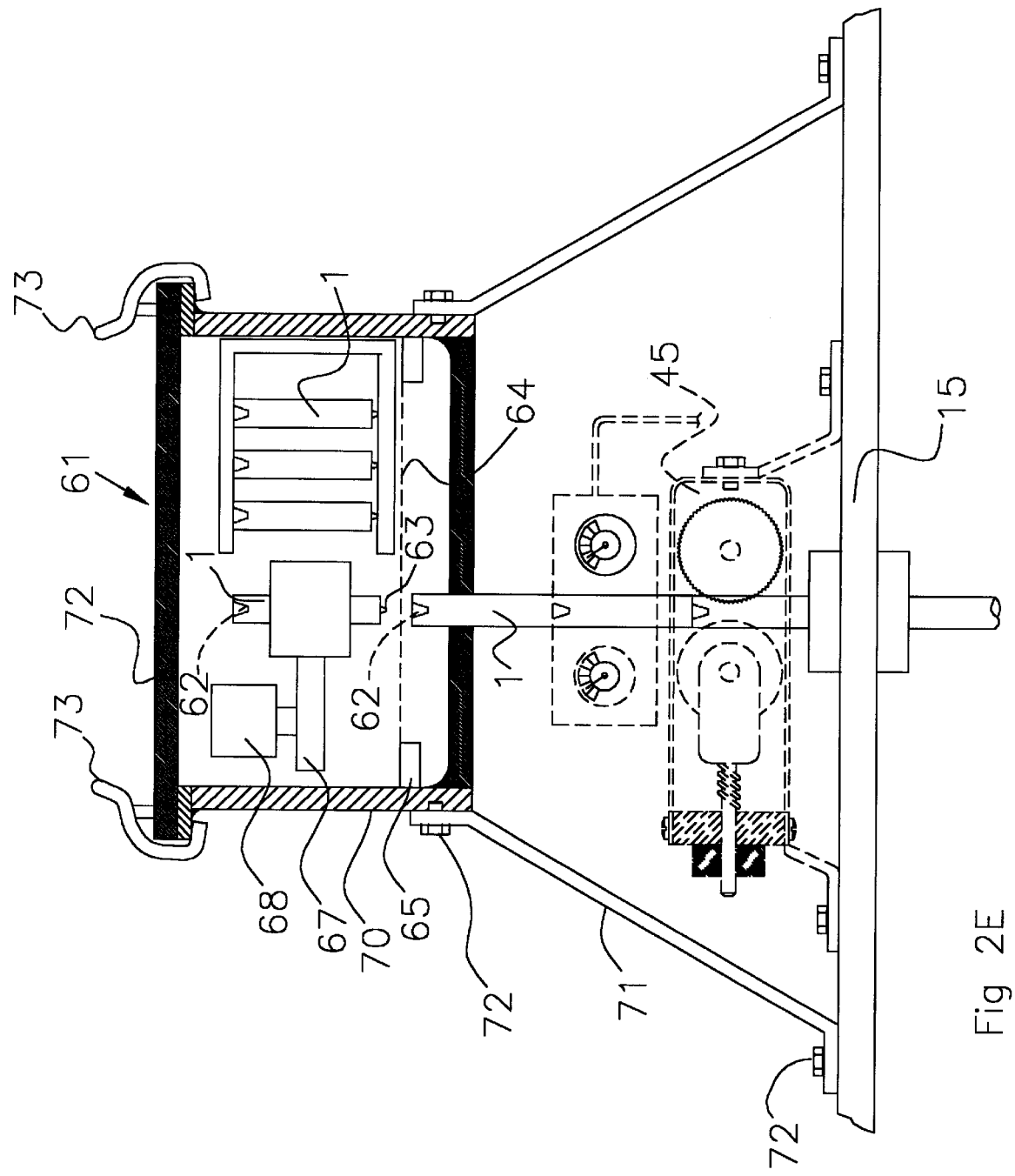
FIG. 2E depicts an equipment for the automatic reloading of carbon rods.

AUTOMATIC ROD RELOADING ASSEMBLY, as per FIG. 2A here collectively indicated 61, as more particularly described in FIG. 2E with respect to which the assembly comprises automatic means for interlocking the ¾" by 12" carbon rods 1 via their tapered and threaded, female end 62 and male end 63, including infrared sensors 65, 66 for the end 64 of the uppermost carbon rod 1 with sender unit 65 and receiving unit 66, plus an automatic arm 67 power assisted by an electric motor 68 and related commercially available electronic controls (not included in FIG. 2E for simplicity), which automatic arm 67 grabs a new carbon rod I from the magazine 69 storing 300 identical carbon rods sufficient for four hours of operation, and then said automatic arm 67 inserts the threaded male 63 of the new carbon rod I in the threaded female top 62 of the last carbon rod, the assembly being completed by an all encompassing case 70 fabricated from ¼" stainless steel metal which is fastened to the metal top 15 of the main vessel assembly 10 via legs 71 and bolts 72 or welding 13, said all encompassing metal case 70 having a ¼" stainless steel top 72 equipped with rapidly removing fasteners 73 for the fast reloading of the internal magazine 69 with new carbon rods, as well as for servicing, FIG. 2E also including in dashed lines the automatic feeder assembly 45 to illustrate the top position of the automatic reloading assembly.

GAS UTILIZATION ASSEMBLY, as per FIG. 2A collectively indicated 74, for the utilization of the combustible gas produced by the reactor, comprising the hole 75 of approximately 4" in diameter in the top 15 of the metal vessel assembly 10 through which the gas produced by the reactor can freely exit, a stabilizing chamber 76 consisting of a tank of about ¼" in thickness, 2' in diameter and 4' in length generally positioned vertically in the top of the main vessel assembly 10 for the liquid waste expelled with the gas to settle down and return inside the vessel, a valve 77 for the control of the pressure inside the reactor vessel at a pre-set value, a filter 78 for the removal of carbon, residual liquid waste, and other particulates from the produced gas, stainless steel tubing 79 interconnecting the stabilizing chamber 76, the valve 77 and the filter 78 with welding 13 or other pressure resistant means, and the gas outlet 80 into a conventional utilization equipment (not shown in FIG. 2A for simplicity), such as a commercially available gas pump to transfer the gas into commercially available tanks.

HEAT UTILIZATION ASSEMBLY, as per FIG. 2A collectively denoted 81, for the utilization of the heat produced by the reactor and acquired by the liquid waste 18, consisting of a recirculating 1 HP pump 82 with inlet 83i originating inside the main vessel assembly 10, which recirculating pumps 82 forces the liquid waste 18 into an outside heat utilization equipment 84, such as a radiator with fan or a heat exchanger, after which said recirculating pump 82 forces the liquid waste 18 back into the metal vessel via outlet 85, said heat utilization assembly 81 being served by a standard, high pressure, stainless steel tube 86 of 1" internal diameter which is fastened to the main vessel assembly 10 by welding 13 or other pressure resistant means.

PLUS MISCELLANEOUS SAFETY AND COMPLEMENTARY EQUIPMENT NOT INDICATED IN FIG. 2 FOR BREVITY, such as: a gauge with automatic shut-off in the event of leak of gas outside the main vessel assembly 10; a gauge also with automatic shut-off in the event of oxygen produced in gas of 5% or more due to inadvertent electrolysis; sensor with an automatic shut-off, usually included in the automatic feeder assembly, in the event of termination of breakdown of carbon rods;pressure gauge with automatic shut-off in the event of the pressure inside the main vessel reached 25 psi; liquid waste level gauge with automatic shut-off in the event the liquid waste level is 3" below the top line; independent filters in both the PlasmaArcFlow assembly 35 and the heat utilization assembly 81 to remove impurities from the liquid waste 18; an all containing cart; pump operated means for connecting the main vessel assembly 10 to an outside tank of the desired capacity; an overall encompassing insulating cover to avoid accidental human contacts with the reactor; and other equipment.

The operation of the above preferred embodiment of the reactor at atmospheric pressure are the following: the reactor vessel is filled up completely with the liquid waste 18 to be recycled, such as automotive antifreeze waste or oil waste; a set of three manually interlocked 12" long carbon rods 1 are inserted from the top by pushing it through the driving mechanism of the automatic feeder assembly 45, through the seals 27 of the top bushing 24 as in FIG. 2A, as well as through the copper contacts 29 of FIG. 2B, in such a way that said interlocked carbon rods are positioned with the end tip 97 at about 1" distance from the top of tip 98 of the stationary cathode 2; the reactor is primed or purged for the complete removal of atmospheric oxygen in the gas collection system; the PlasmaArcFlow and heat utilization pumps:are activated; the automatic feeder of the electric arc as per FIGS. 2C and 2D is initiated on at a distance or via computer sequence which initiation first sends an electric current to the motor 30 of FIG. 2D which pushes downward the carbon rod 1 until contact with the cathode 2 is established and the electric arc is initiated, and thereafter the automatic feeder 45 senses the voltage of the electric arc every 50 milliseconds and correspondingly sends an electric impulse to motor 50 for the micrometric motion of the carbon rod 1 downward in the event the voltage has increased, or upward in the event the voltage has decreased, thus maintaining in this way the optimal pre-set voltage of the electric arc, which is about 40 V DC for a power source of 50 Kwh; combustible gas is then produced immediately following the initiation of the electric arc by exiting through the outlet 80 for pumping in conventional tanks; heat in the liquid waste 18 is also initiated immediately following the initiation of the electric arc, although it reaches the operating temperature of 180 degrees F. indicated earlier after about 3 minutes, following which the heat utilization assembly 81 becomes operative.

Following the above sequence, the operator remains on a stand-by, and intervenes only in the event of an automatic shut-off. In this case the related emergency light identifies the problem causing the shut-down, which can then be serviced.

Needless to say, the above reactor can be built according to a large number of variations, including smaller size models powered by less than 50 Kwh, or bigger size models powered by DC power sources bigger than 50 Kwh, with consequential downgrading or upgrading of the entire structure, including the use of electrodes with a diameter correspondingly smaller or bigger than ¾" in diameter.

Similarly, tests have established that several electric arcs can be put in series as per FIG. 1D within the same main vessel assembly 10 and powered by the same DC electric power unit either in series or in parallel electric connections; the same reactor can be constructed with several electric arcs put in parallel and powered either by the same power unit or by individual power units. The same reactor described above can be used for the efficient separation of the water as described earlier; the same reactor described above equally works up to internal pressures of the maximal value of 20 psi, after which the automatic feeding mechanism of the carbon rods 1 is no longer operational due to the force from the interior of the vessel tending to push the carbon rod 1 out.

The same reactor herein described can be used to a new method of utilization of crude fossil oil, consisting in its complete recycling into a clean burning combustible gas, plus solid precipitates useful for various industries, which methods has manifest advantages over the current process of crude oil via refineries, because of the dramatically better exhaust of the fuel produced, less operating costs, and logistic advantages due to the smallness and related mobility of the reactor as compared to the very large size of conventional refineries.

It should be indicated that the above embodiment equally works with an AC electric arc, although the latter requires different electrodes, and produces a smaller efficiency. The main difference with the embodiment of FIGS. 2A–2E is the fact that both electrodes are generally consumed for an AC electric arc within liquids, thus requiring two different power assisted automatic feeders of the electrodes, interconnected in such a way to maintain not only the same voltage, but also the same location of the electric arc in the venturi 6, both features being realizable with commercially available equipment, such as the automatic feeder Model NP600 produced by Arc Air, a division of Tweeco, the large manufacturer of carbon rods.

Figure 3:
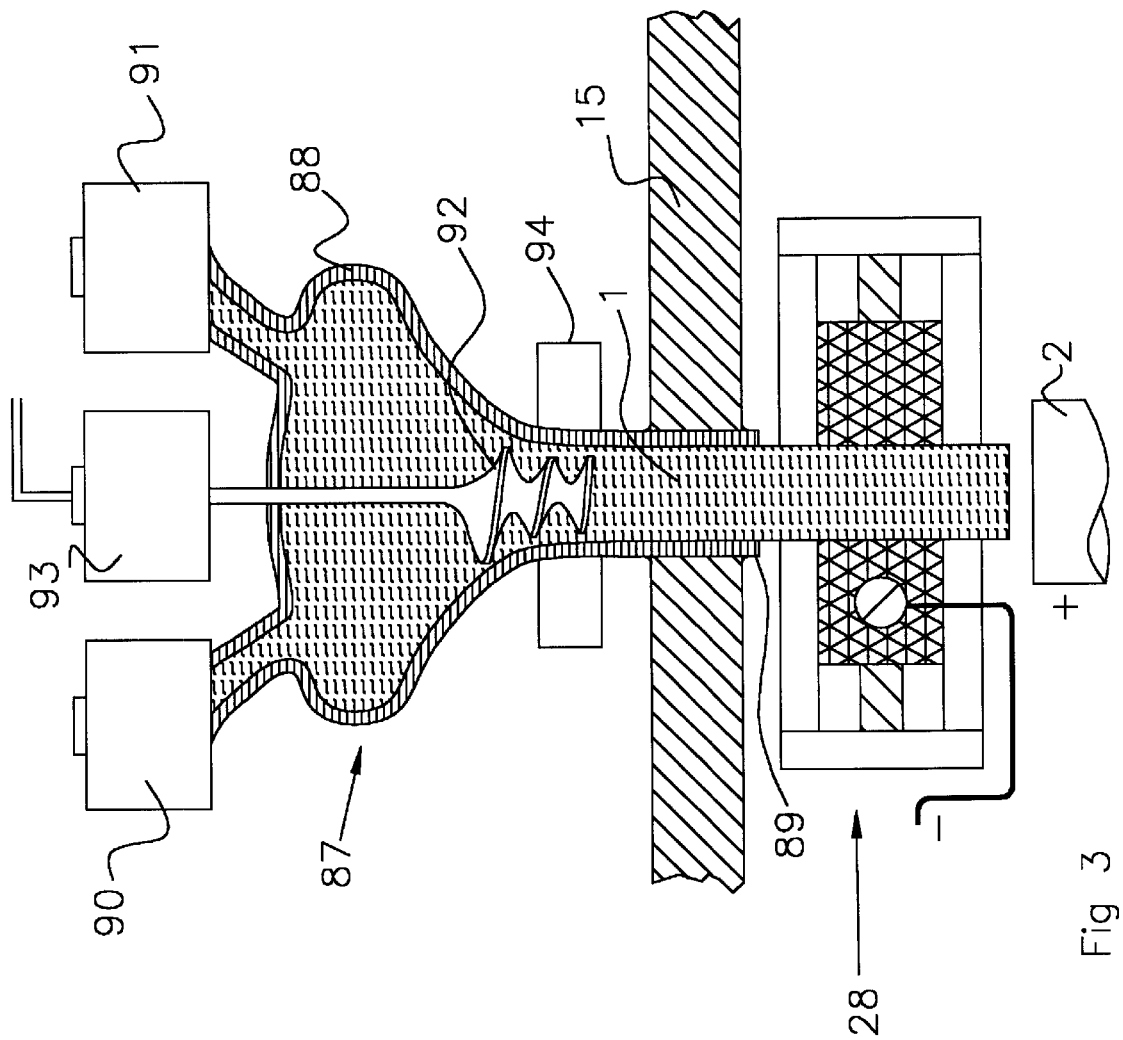
FIG. 3 depicts a new equipment for the extrusion of the anode directly in the PlasmaArcFlow Reactor via the use of coal and bonding agent.

FIG. 3 depicts a preferred embodiment for a new method of coal gasification, whose main advantages over the embodiment of FIGS. 2A–2E are: 1) Dramatic reduction of the operating cost; 2) Improvement of the continuous use of the reactors; and 3) Increase of the energy content of the combustible gas produced.

The embodiment of FIG. 3 essentially consists in a process for the extrusion of the anode from powdery coal plus a bonding agent such as tar. In this way, coal is decomposed by the electric arc into its atomic constituents. The reactor then separates these elements into volatile components which are used to form a combustible gas, plus solids which precipitate at the bottom of the reactor where they are collected periodically for industrial and other uses.

Alternatively, the embodiment of FIG. 3 provides a new method of coal gasification, with clear advantages over other methods.

More specifically, in the preferred embodiment of FIG. 3 depicts the anode extrusion assembly collectively indicated 87 which the anode coal rod 1 has the approximate dimension of ¾" and it is continuously extruded from an all encompassing metal container 88 made up of stainless steel ⅛" in wall thickness, whose bottom part has the approximate shape of a funnel terminating in a cylindrical part 89 having the interior diameter equal to the exterior diameter ¾" of the coal rod 1, which cylindrical part is fastened to the top 15 of the main vessel assembly 10 by welding 13 or other pressure resistant means, said container 88 being internally coated with teflon or other high temperature slippery material'to facilitate the extrusion; a separate tank 90 supplies the powdery coal to or other conducting powder to the container 88 via a commercially available metered dispenser (not shown for simplicity), while the separate tank 91 supplies the bonding agent, such as tar 6r epoxy, also according to a commercially available metered dispenser (not shown in the figure for simplicity). The interior of the container 88 contains a helical gear 92 with maximal clearance with the wall of the container 88 of about ¹⁄₁₆" and a large pitch of about ½", said helical gear 92 being powered by electric motor 93 of about 1 HP; said gear 92 mixes the coal and the bonding agent and pushes them downward. Bonding means 94, such as an electric heater, then bonds the coal and the tar into a solid rod usable as anode 1; following its extrusion, the !coal rod enters into the contact assembly 28 of FIG. 28 for the delivery of the DC electric current with negative polarity. At the exit of said contact assembly 28, the coal rod 1 is finally exposed to the stationary, nonconsumable cathode 2 made up of a tungsten rod of about 2" in diameter and 3" in length. The electric arc is then initiated and continues as per the embodiment of FIGS. 2C and 2D.

The operation of this new method of coal gasification is the following. First, tank 90 is filled up with coal and tank 91 is filled up with the selected bonding agent. The entire extrusion equipment is then primed to eliminate any atmospheric oxygen for safety. The container 88 is filled up with powdery coal and the selected bonding agent in the appropriate proportion. The electric motor 93 is started and the bonding fixture 94 is activated, resulting in the extrusion of the coal rod 1 which penetrates inside the top 15 of the main vessel assembly 10. Sensors indicate the penetration into and exiting of said coal rod out of the electric contacts assembly 28, by therefore activate the automatic feeder as per the embodiment of FIGS. 2D and 2E. Rather than moving the carbon rods 1 toward the cathode 2 as per the embodiment of FIG. 2A, the same automatic feeder assembly 45 is used this time to control electric motor 93 for the scope of controlling the speed of extrusion of the coal rod 1. The initiation of the arc occurs under an electric short and consequential consumption of the coal rod 1 to the gap 3 of the electric arc. Subsequently, in the event of increase of the arc voltage, indicating an increase of the arc gap 3, said speed is increased by said automatic feeder assembly 45, while in the event of decrease of the arc voltage, indicating a decrease of the arc gap 3, the extrusion is halted, thus achieving constant voltage.

This invention also includes the following alternative approach to the gasification of coal into a combustible gas via the PlasmaArcFlow Reactors. First, coal can be independently extruded into coal rods of the outside diameter ¾ and 12 length with tapered threaded ends as in FIG. 2E. In this case, said coal rods can be used in the automatic reloading assembly 61 of FIG. 2E in lieu of carbon rods, resulting in exactly the same coal gasification as that of the automatic extrusion assembly 87 of FIG. 3.

Alternatively the automatic feeder of FIGS. 2B and 2C merely initiates and maintains the electric arc without feeding the anode due to consumption.

One of the main features of the reactors as per FIGS. 2A–2E and 3 is that of permitting continuous, 24 hours use without interruptions except for service. This is permitted by the inter-locking character of the carbon or coal rods, which, as such, can be continuously fed into the electric arc. In particular, due to the linear character of the interlocking rods, the anode must necessarily penetrate into the main vessel assembly 10 through seals 27 as in FIG. 2A.

A limitation of the above embodiments is that they can only operate at limited pressure of the maximal order of 20–30 psi. This is due to the fact that, at higher pressures, the automatic feeder cannot any longer force the carbon or coal rod into the reactor due to the excessive value of the force trying to push the same rod out of the vessel due to the internal pressure.

Figure 4:
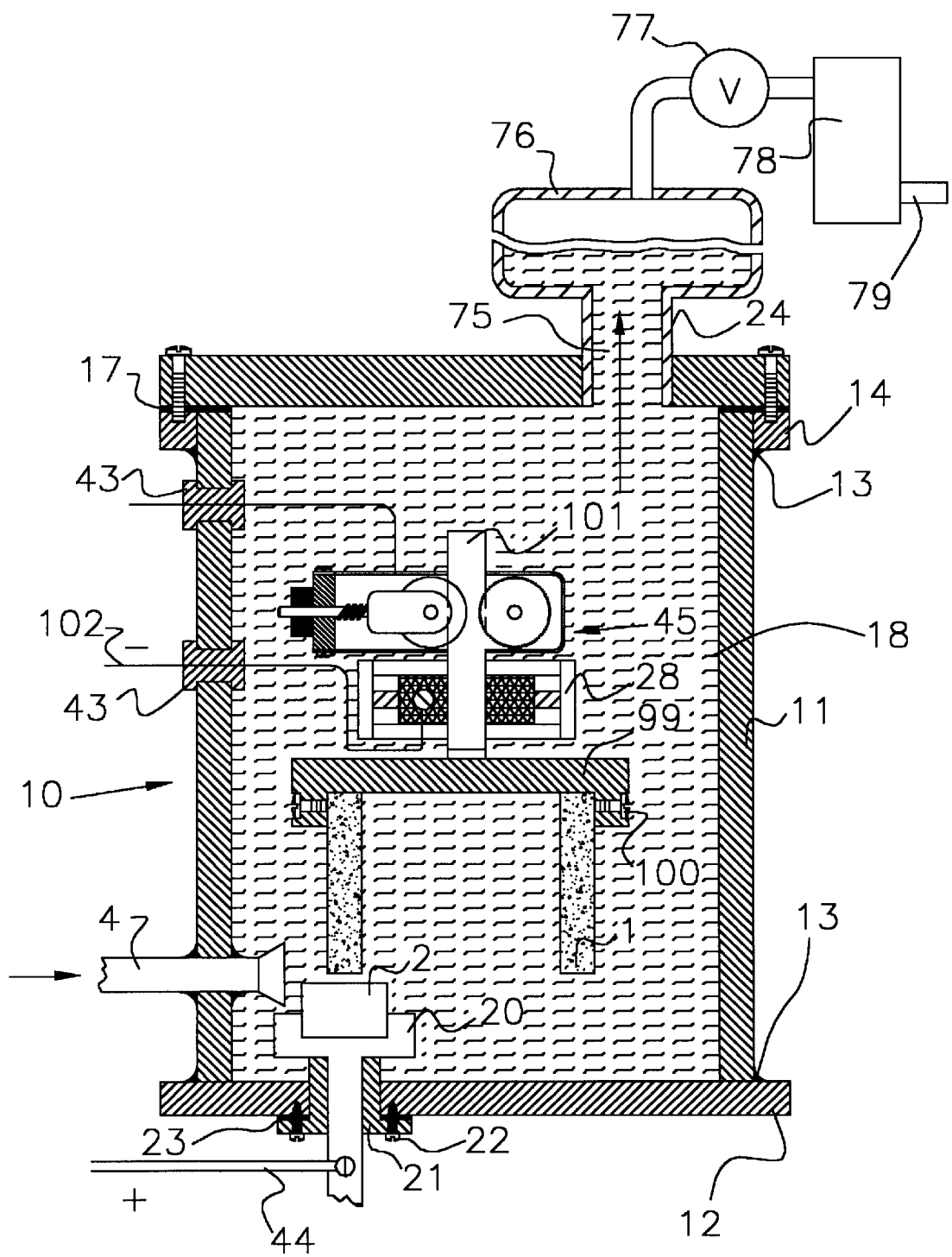
FIG. 4 depicts the new PlasmaArcFlow Reactor for the total recycling of the liquid waste.

The preferred embodiment of FIG. 4 depicts a yet new type of reactor which can operate at high value of internal pressure, of the order of 200 to 300 psi. This new system is composed by the following main parts:

MAIN CLOSED VESSEL ASSEMBLY, collectively denoted 10, essentially similar to that of FIG. 2A, and comprising a vertical steel cylindrical sidewall 11 of about 1" thickness, about 3' external diameter and about 7' height, with base 12 consisting of a steel disk of 2" thickness and 3' and 1" in outside diameter fastened to sidewall 11 via high pressure resistant continuous welding 13, the vessel being additionally completed by the steel flange 14 of 2" thickness and 3' 3" in outside diameter fastened to said sidewall 11 via high pressure resistant continuous welding 13, plus a top 15 composed by a steel disk of 2" in thickness and 3' and 3" in outside diameter, which is fastened into the flange 14 via bolts 16 or other means, gasket 17 assuring the complete sealing of the interior chamber in such a way to sustain high pressure, said closed metal vessel being completely filled up with the contaminated liquid waste 18 to be recycled.

ELECTRODES ASSEMBLY, collectively denoted 19, comprising the stationary nonconsumable cathode 2 composed by a tungsten rod of at least 2" in outside diameter and 3" in length, housed into a copper holder 20 which protrudes below and outside the base 12 of the vessel and it is insulated electrically from the same base 12 by the nonconducting bushing 21, fastened to the base 12 by screws 22, gasket 23 ensuring the complete sealing under pressure of the main vessel, said busing 21 being made of phenolic or other electric insulator in the shape and dimension so as not to allow any distance less than 1" between the cathode holder 20 and said metal base 12; plus a consumable anode 1 made of carbon, coal or other conducting material, in the shape of a cylinder having the thickness of ¾", the radius of one foot, and the height of 3', said cylindrical anode 1 being housed inside a copper cup 99 holding the cylindrical anode with fasteners 100, said assembly of the cylindrical anode 1 and its copper holder 99 terminating in the upper part into a copper rod 101 of ¾" in diameter and height longer than the consumable length of the cylindrical anode 1, e.g., 4' height, said copper rod 101 passing through a contact assembly 28 for the delivery of the electric current with negative polarity similar to that of FIG. 2B, the negative polarity being delivered by high current electric wires 102 while the electric current with the positive polarity is delivered to the copper holder 20 of the cathode 2 in its part protruding outside,and below the base 12, as per the embodiment of FIG. 2A.

PLASMA-ARC-FLOW ASSEMBLY, collectively denoted 35, comprising the configuration of FIG. 1A served by a recirculating pump similar to that of FIG. 2A, although not included in FIG. 4 for simplicity;

ELECTRIC POWER ASSEMBLY, collectively denoted 40 also similar to that of FIG. 2A, comprising a 50 DC electric generator, such as the commercially sold model Dimension 1000 made in the U.S.A. by Miller Corporation, with high current copper cable 102 to deliver the negative polarity to the interior contact assembly of FIG. 2B and copper cable 44 for the delivery of the positive polarity to the cathode holder 20 protruding below and outside the base 12 of the vessel, and automatic feeder 45 for the initiation, maintaining and optimization of the electric arc similar to that of FIG. 2C and 2D although, this time, with the driving head completely submerged inside the vessel assembly 10 and the electronic part outside it, said automatic feeder being additionally modified to have the capability of rotating the copper rod 101 of the cylindrical anode 1 at the speed of 5 r.p.m. in addition to its motions along the rod axis, so as to permit the rotation of the cylindrical anode 1 over the cathode 2. In addition to the motion of the cylindrical anode 1 toward and away from the stationary cathode 2.

COMBUSTIBLE GAS UTILIZATION ASSEMBLY 74, as per FIG. 2A, here omitted for simplicity.

HEAT UTILIZATION ASSEMBLY 81, as per FIG. 2A, here omitted for simplicity. PLUS MISCELLANEOUS SAFETY AND COMPLEMENTARY EQUIPMENT NOT INDICATED IN FIG. 4 FOR BREVITY, essentially the same as per the embodiment of FIGS. 2A–2E, here also omitted for simplicity.

The operation of the preferred embodiment of the high pressure reactor as per FIG. 4 is the following: the cylindrical carbon or coal anode 1 is inserted into its copper holder 99 and placed in the position suitable to initiate the arc; the closed reactor vessel is filled up completely with the liquid waste 18 to be recycled, such as automotive antifreeze waste or engine oil waste or crude oil; the reactor is then primed for the complete removal of atmospheric oxygen in the interior of the vessel; the PlasmaArcFlow and heat utilization pumps are activated; the automatic feeder of the electric arc is initiated at a distance from the equipment or via computer sequence; the cylindrical carbon or coal anode 1 initiates rotation edgewise with respect to the tungsten cathode 2, while advancing also head-on until the electric arc is initiated; as the carbon or coal is consumed by the electric arc at one point of the edge of the cylinder anode 1, the rotation of the latter, plus its micrometric downward motion when needed, permit keeping constant the electric voltage of the arc, thus maintaining constant its gap; a combustible gas is immediately produced following the initiation of the electric arc, jointly with the production of heat in the liquid; operation initiates a't atmospheric internal pressure, and rapidly increases with the production of the combustible gas to the preset pressure of the gauge-valve assembly 77; all gas produced in excess of said predetermined pressure is then permitted to exit the reactor and be pumped into conventional storage tanks.

While the low pressure reactor in the embodiment of FIGS. 2A–2E can operate continuously 24 hours a, day with the sole interruption due to service, the high pressure reactor in the embodiment of FIG. 4 needs the periodic replacement of the cylindrical carbon or coal anode 1 every 5 hours of work for the cylinder dimension given above. Such replacement can be realized via means for fast removal of the top 15 of the vessel 10 and fast reloading of the new cylinder anode.

To understand the duration of said cylindrical anode, recall that a ¾" carbon or coal rod consumes at the rate of about ½" per cubic foot. A cylindrical anode with ¾" thickness, 1' radius and 3' height is the equivalent of 300 linear rods of ¾" in diameter and 12' length, thus being useful for the production of 7,200 cubic feet of gas which, at the rate of 900 cf/h last for 8 continuous working hours, as indicated. Longer durations of the cylindrical anode can be easily accommodated by increasing its radius, or its height or both. Sufficiently larger vessel can, therefore, be designed to work continuously for 24 hours, then halt operation for the rapid replacement of the cylindrical anode, and then resume operations immediately thereafter.

The high pressure reactor as per FIG. 4 is expected to have an efficiency dramatically larger than that of low pressure reactors, because the production of combustible gas in the electrodes gap displaces the liquid waste to be recycled, as a consequence of which the electric arc occurs for the majority of the time, estimated to be 60%, within the: gas produced, rather than within the liquid, and consequential relatively low efficiency.

By comparison, when operated at pressures of the order of 200 or 300 psi, the bubbles of gas produced by the electric arc 95 are dramatically reduced in size by at least 99%. It then follows that the electric arc occurs for the majority of the time within the liquid to be recycled, thus dramatically increasing the production of combustible gas, with corresponding dramatic increase of the heat produced.

An alternative embodiment is that of FIG. 4 in which the negative polarity of the electric current is delivered via copper busing essentially similar to those of FIG. 2B sliding on the exterior cylindrical surface of the anode 1 at about 1" distance from its lower edge and positioned as close as possible to the electric arc to minimize losses of electric energy due to the high resistance of carbon. In this alternative embodiment the a contact assembly is the same as that of FIG. 2B, except for the fact that the anode 1 has now the outside diameter of 2', while the anode driving assembly is the same as that of FIGS. 2C, 2D, the only difference being that the assembly now drives the copper rod or shaft 101 of the anode 1 and contains an additional means for the rotation of the same while advancing. The main advantage of this alternative embodiment is a substantial savings of electric energy. In fact, for the embodiment of FIG. 4 the electric current has to pass through the entire length of the cylindrical anode, with considerable losses due to known resistance of carbon which is about 300 times the resistance of copper. By comparison, the latter embodiment implies the delivery of the current very close to the arc, thus avoiding the preceding waste of electric energy.

Figure 5:
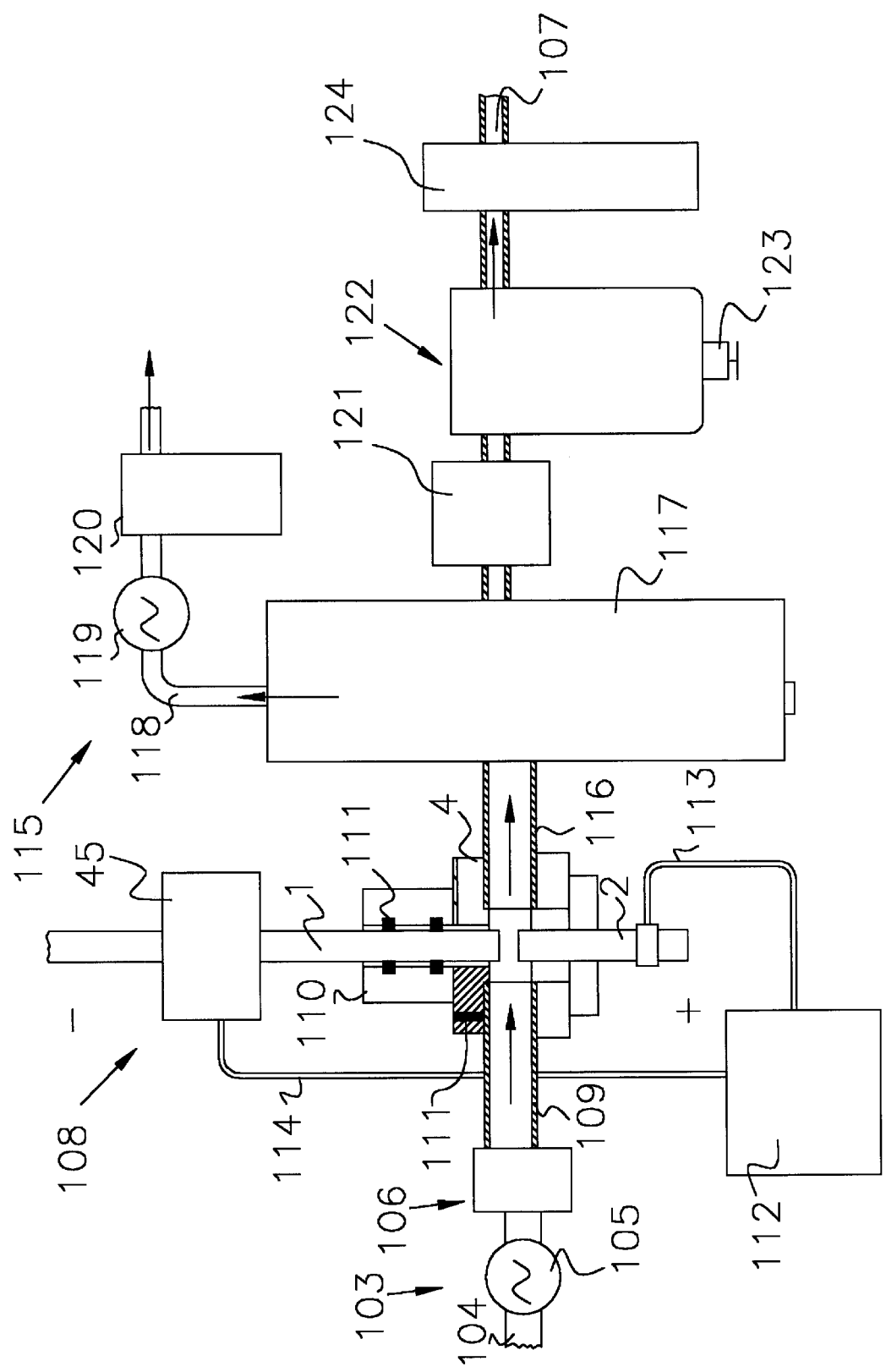
FIG. 5 depicts a preferred embodiment for an automatic, PlasmaArcFlow Reactor for the recycling of biologically contaminated waters.

A preferred embodiment of a linear reactor for the recycling of liquid sewage is depicted in FIG. 5, and comprises the following seven stations:

STATION 1: FILTER-MACERATOR ASSEMBLY, collectively denoted 103, comprising a stainless steel inlet tube 104 of the approximate interior diameter of 1" in which the liquid sewage is immitted, followed by a filter-macerator pump assembly 105 intended to remove large particulates from penetrating the equipment, as well as emulsify biological granules into a form which can be processed by the equipment.

STATION 2: FLOW VALVE CONTROL AND METER ASSEMBLY, collectively denoted 106, comprising valves for the control of the flow to a pre-set value as well as flow meters for their measurement, so as to set the equipment to operate at the desired rate of recycling.

STATION 3: PLASMA-ARC-FLOW REACTORS, collectively denoted 108, comprising a stainless steel tube 109 in the approximate interior diameter of 1" which ends in the venturi 6 of FIG. 1B containing a stationary tungsten cathode 110 and a consumable coal or carbon anode 1, the venturi 6 having a pressure resistant protuberance 110 vertically upward through which the anode 1 penetrates via seals 111 so as to form a completely sealed equipment against water leaks, said electrodes being powered by a 50 Kwh DC electric generator 112 delivering the positive electric polarity to the cathode via high current copper cables 113 and the negative electric polarity to the anode via the high current copper cable 114 into the submerged contact assembly of FIG. 2B positioned as close as possible to the venturi 6 to minimize losses of electric power, the arc 95 being initiated, maintained, and optimized by an automatic control unit similar to that of the reactors of FIGS. 2A–2E and 4, which is positioned in the outside and on the top of the reactor as per FIGS. 2C and 2E.

STATION 4: GAS UTILIZATION UNIT, collectively denoted 115, consisting of the stainless steel tube 116 of about 1" internal diameter, which continues the linear flow of the liquid this time into a stabilizing chamber 117 consisting of a cylindrical, vertically placed, stainless steel tank of about ¼" in thickness, 2' in diameter and 6' in height placed mid-way with respect to inlet tube 116, having the purpose of separating the gas produced by the processed liquid, the gas being expelled at the top pipe 118, also formed of a stainless steel tube of approximately 1" internal diameter, followed by a pressure regulator 119, and a filter 120, after which the stainless steel pipe is connected to a standard pump for compression of the gas into a standard gas tank.

STATION 5: DEGAUSSING. collectively denoted 121, consisting of an industrial microwave oven absorbing about 3 Kwh with an interior dimension of approximately 6'×6'×6', and an internal serpentine of non-metallic tubing such as glass of approximately 1" internal diameter, operating at the resonating frequency of the water as in consumers microwave ovens.

STATION 6: CENTRIFUGE, collectively denoted 122, consisting of a conventional, commercially available centrifuge 122 suitable to serve the flow of 1,000 g/h, for the removal of solid precipitates from the processed liquid, equipped with means 123 for the periodic removal of said solid precipitates without interruption of the operations, said centrifuge being equipped with a bypass not shown in the figure in the event its operation is not desired.

STATION 7: FINAL FILTER, collectively denoted 124, comprising a commercially available filter whose porosity is that requested by the environmental protection authority for the specific application at hand, said filter, being equipped with a bypass not shown in the FIG. 5 for brevity.

PLUS ADDITIONAL SAFETY AND CONTROL GAUGES, including outside gas detectors with automatic shut off in the event of leaks; sewage pressure gauge with automatic shut-off in the event of a pressure build-up; panel for the remote initiation and control of the operations, including all needed shut-off switches, etc.

The operation of the above preferred embodiment for the linear recycler is the following. The coal or carbon rod 1 is inserted; the control of Station 2 is preset at the desired flow, say, 1,000 g/h; the inlet line 104 is connected to town water; the macerator pump 105 is initiated; and the electric arc is activated, which operations initiate the production of gas and irrigation water. Once the functioning of the equipment with city water is verified, the liquid sewage is immitted with a bypass which disconnects the use of city water. The sewage is then recycled by the arc, which kills all bacteriological activities, partially decomposing the biological contaminants into gaseous and solid precipitates, and baking the rest into a form usable as fertilizers. The liquid sewage so processed is then forced by the macerator pump 105 into the gas stabilizing tank 117 in which the liquid grows up to a point over the mid-line pre-set by the pressure valve 119. In this way, gas is produced, filtered and passed to a conventional pump for storage in conventional tanks. The processed liquid sewage continues its linear flow this time into the degaussing station which has the purpose of removing the magnetic polarization acquired by the water molecules when passing through the very intense magnetic fields of the electric arc estimated to be of the order of 10 Tesla or more, said degaussing station removing said magnetic polarization by merely forcing the water molecules to enter into violent vibration because invested by a microwave with the resonating frequency of the water. Upon being degaussed, the processed liquid sewage passes through the centrifuge for the elimination of unwanted solid particulates. The liquid sewage so processed then passes through the filter 124 to reach the purity of the final irrigation water as requested by environmental authorities, by exiting through outlet 107.

A virtually endless number of variations, additions, or modifications of the embodiment of FIG. 5 are possible, such as the extension of the indicated linear recycler with two or more Stations 3 and related Station 4 all connected in series, and each equipped with a bypass, for improving the recycling of the same flow to the desired quality, or the use of several complete linear recyclers placed; in parallel for the increase of the flow of the processed sewage.

The invention herein described is clearly new and useful. Moreover, it was not obvious to those of ordinary skills in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings, shall be interpreted as illustrative and not in the limiting sense.

It is also to be understood that the following claims are intended to cover all of the generic and:specific features of the invention herein described, and all statements of the scope of the invention which, as a matter of language, might be said to fall therebetween.

What is claimed is:

1. An apparatus for recycling a liquid into a combustible gas comprising:
   a pressure resistant metal vessel;
   means for generating an electric current to at least one pair of electrodes and for creating an electric arc between tips of said electrodes, said electrodes having at least their tips disposed inside said metal vessel;
   at least one of
      means for flowing said liquid directly through said electric arc between said tips thereby exposing said liquid first to a plasma formed by the electric arc around said tips and subsequently through said electric arc,
      means for flowing said liquid through a tube surrounding said tips thereby forcing said liquid into an essentially concentrated passage first through the plasma formed by said electric arc around said tips and subsequently through said electric arc, and
      means for flowing said liquid through an interior of one of said electrodes thereby concentrating the flow of the liquid first through the electric arc and subsequently through the plasma formed by said electric arc around said tips,
   each of said means for flowing may be one of external and in fluid communication with the vessel to circulate the liquid from inside said vessel back into said vessel and through the plasma and electric arc, and internal to said vessel to circulate the liquid through the plasma and electric arc;
   means for collecting a clean burning combustible gas created by said arc acting on said liquid, the gas bubbling through the liquid in the vessel to a gas collection outlet in mechanical fluid communication with the vessel proximate a top of the vessel; and
   means for removing solids in suspension in said liquid following its passing through said arc, wherein said solids precipitate to the bottom of the vessel for subsequent collection,
   wherein the apparatus is operated at desired operating electric power settings, pressures, temperatures and flow rates so that the liquid can be one of
      continually circulated and exposed to the plasma and arc until converted to the combustible gas, and
      partially directed out of the vessel for further processing to obtain a reusable liquid, and
   wherein when the liquid is processed to obtain a reusable liquid, filtering means are provided for filtering the liquid following its passage through the arc, said filtering means being in fluid communication with the vessel.

2. The apparatus according to claim 1, wherein at least one of the at least one pair of electrodes is made of carbon-base material.

3. The apparatus according to claim 1, wherein the liquid is a bacteriologically contaminated liquid.

4. The apparatus according to claim 3, wherein the tube is made from a heat resistant material and is positioned relative to the ends of the electrodes so as to expose said contaminated liquid to incandescent ends of said; electrodes thereby sterilizing said contaminated liquid by terminating bacteriological activity within said contaminated liquid.

5. The apparatus according to claim 1, wherein the removed sterilized solids are usable as a fertilizer.

6. The apparatus according to claim 1, wherein the filtered liquid is a clean and sterile water suitable for irrigation use.

7. The apparatus according to claim 1, further comprising:
   electronic means for the automatic initiation of said arc, including means for controlling the arc gap land optimization for achieving a maximal possible gap for maintaining stable voltages and amperes.

8. The apparatus according to claim 1, further comprising:
heat exchanger means for utilizing a heat absorbed by the liquid in its passage through the arc, said heat exchanger means being in fluid communication with the metal vessel.

9. The apparatus according to claim 1, wherein at least one of said pair of electrodes has a cylindrical shape acting edgewise on the other electrode.

10. The apparatus according to claim 9, further comprising:
   means for rotating said at least one cylindrical electrode.

11. The apparatus according to claim 1, further comprising:
   copper means for holding said at least one pair of electrodes, said copper means sealingly protruding said metal vessel.

12. The apparatus according to claim 11, further comprising:
   means for delivering an electric current to said copper means protruding outside said metal vessel and holding said at least one pair of electrodes so as to create an electric arc between the at least one pair of electrodes with minimal dissipation of electric power.

13. The apparatus according to claim 1, wherein following the passage of said liquid through the arc, the solids precipitate to a bottom of the metal vessel for removal by the means for removing said solids.

14. The apparatus according to claim 1, wherein a number of the at least one pair of electrodes is made of coal.

15. The apparatus according to claim 1, wherein the liquid is crude oil.

16. The apparatus according to claim 1, wherein the liquid is water.

17. The apparatus according to claim 1, wherein the liquid is seawater.

18. The apparatus according to claim 1, wherein the produced combustible gas comprises:
   atoms of gaseous substances and molecules thereof, including hydrogen, oxygen and carbon.

19. The apparatus according to claim 18, wherein the combustible gas composes, by volume:
   about 50% hydrogen and about 50% carbon monoxide, including traces of carbon dioxide and oxygen.

20. The apparatus according to claim 18, wherein a combustion exhaust of the combustible gas, produced comprises, by volume:
   about 60% water vapor, about 15% oxygen, about 15% carbon in solid form, about 5% carbon dioxide, and the rest being general atmospheric gases.

21. The apparatus according to claim 1, wherein the electric arc is contained within the tube, the tube having an ellipsoidal sectional area corresponding to an approximate shape of a plasma formed by the electric arc, thereby ensuring the flow of the liquid through the plasma adjacent the electrode tips generating the electric arc and subsequently through a gap between the electrode tips.

22. The apparatus according to claim 1, wherein the electrodes are gear-driven toward the electric arc by power assisted, toothed gears acting with pressure against the electrodes due to counter-balancing insulating idle rollers.

23. The apparatus according to claims 1, wherein the electrodes are gear-driven toward the electric arc by submerged, power assisted, toothed gears acting with pressure against the electrodes, due to a counter-balancing conducting bushing carrying one of the electrodes, and placed substantially near the electric arc.

24. The apparatus according to claim 1, wherein when there are more than one pair of electrodes, the pairs of electrodes and electric arcs are in series.

25. The apparatus according to claim 1, wherein when there are more than one pair of electrodes, the pairs of electrodes and electric arcs are in parallel.

26. The apparatus according to claim 1, further comprising:
   at least one pump for the continuous recirculation of the liquid through the electric arc.

27. The apparatus according to claim 1, further comprising:
   means for the utilization of the combustible gas produced, including a gas stabilization tank positioned above a top level of said liquid.

28. The apparatus according to claim 8, wherein the heat absorbed by the liquid is usable by pumping said liquid through an external radiator in fluid communication with the metal vessel.

29. The apparatus according to claim 8, wherein the heat absorbed by the liquid is usable by pumping said liquid through one of an external and internal heat exchanger in fluid communication with the metal vessel.

30. The apparatus according to claim 8, wherein the heat absorbed is usable for the desalinization of sea water via evaporation means in fluid communication with the metal vessel.

31. The apparatus according to claim 1, wherein the combustible gas is emmited into a stabilization tank positioned on a top of the metal vessel having an opening for mutual communication between the stabilization tank and the metal vessel, so as to permit the settling down of the liquid trapped in the combustible gas and its return to the metal vessel.

32. The apparatus according to claim 1, further comprising:
   gas filter means in fluid communication with the metal vessel for filtering and removing solid and liquid particulates in the combustible gas prior to its release for use.

33. The apparatus according to claim 1, further comprising:
   a degaussing station in fluid communication with the metal vessel for further processing of said liquid after said liquid passes through the electric arc.

34. The apparatus according to claim 1, further comprising:
   a centrifuge in fluid communication with the metal vessel for the removal of solid components in the recycled liquid.

35. The apparatus according to claim 1, wherein the arc is created by a continuous current.

36. The apparatus according to claim 1, wherein the arc is created by an alternating current.

37. The apparatus according to claim 2, further comprising:
   means for extruding the least one carbon-base electrode from a carbon-base powder and a bonding agent thereby providing continuous use.

38. A method for producing a clean combustible gas from the recycling of a liquid, the method comprising:
   providing a pressure resistant metal vessel;
   providing means for generating an electric current to at least one pair of electrodes and for creating an electric arc between tips of said electrodes, said electrodes having at least their tips disposed inside said metal vessel;
   providing at least one of means for flowing said liquid directly through said electric arc between said tips thereby exposing said liquid first to a plasma formed by the electric arc around said tips and subsequently through said electric arc, means for flowing said liquid through a tube surrounding said tips thereby forcing said liquid into an essentially concentrated passage first through the plasma formed by said electric arc around said tips and subsequently through said electric arc, and means for flowing said liquid through an interior of one of said electrodes thereby concentrating the flow of the liquid first through the electric arc and subsequently through the plasma formed by said electric arc around said tips, wherein each of said means for flowing may be one of external and in fluid communication with the vessel to circulate the liquid from inside said vessel back into said vessel and through the plasma and electric arc, and internal to said vessel to circulate the liquid through the plasma and electric arc;

providing means for collecting a clean burning combustible gas created by said arc acting on said liquid, the gas bubbling through the liquid in the vessel to a gas collection outlet in mechanical fluid communication with the vessel proximate a top of the vessel;

providing means for removing solids in suspension in said liquid following its passing through said arc, wherein said solids precipitate to the bottom of the vessel for subsequent collection;

essentially filling the metal vessel with the liquid to be recycled such that the electrode tips are submerged within the liquid;

commencing the flow of the liquid through the tips of the electrode and initiating the generation of the electric current so as to create the electric arc and subjecting the flowing liquid to said arc, wherein the apparatus is operated at operating electric power settings, pressures, temperatures and flow rates so that the liquid can be one of continually circulated and exposed to the plasma and arc until converted to the combustible gas, and partially directed out of the vessel for further processing to obtain a reusable liquid, and wherein when the liquid is processed to obtain a reusable liquid, further providing filtering means for filtering the liquid following its passage through the arc, said filtering means being in fluid communication with the vessel;

collecting the clean combustible gas produced by the flowing of the liquid through the arc; and removing said solids in suspension following its passage through the arc.

39. The method according to claim 38, wherein the liquid is a bacteriologically contaminated liquid.

40. The method according to claim 39, wherein the tube is made from a heat resistant material and is positioned relative to the ends of the electrodes so as to expose said contaminated liquid to incandescent ends of said electrodes thereby sterilizing said contaminated liquid by terminating bacteriological activity Within said contaminated liquid.

41. The method according to claim 38, wherein the removed solids are usable as a fertilizer.

42. The method according to claim 38, further comprising: providing said filtering means for filtering the liquid following its passage through the arc, said filtering means being in fluid communication with the metal vessel; and filtering said liquid following its passage through the arc.

43. The method according to claim 42, wherein the filtered liquid is a clean and sterile water suitable for irrigation use.

44. The method according to claim 38, wherein a number of the at least one pair of electrodes is made of coal.

45. The method according to claim 38, wherein the liquid is crude oil.

46. The method according to claim 38, wherein the liquid is water.

47. The according to claim 38, wherein the liquid is seawater.

48. The method according to claim 38, wherein the produced combustible gas comprises:

atoms of gaseous substances and molecules thereof, including hydrogen, oxygen and carbon.

49. The method according to claim 48, wherein the combustible gas comprises, by volume:

about 50% hydrogen, and about 50% carbon monoxide, including traces of carbon dioxide and oxygen.

50. The method according to claim 48, wherein a combustion exhaust of the combustible gas produced comprises, by volume:

about 60% water vapor, about 15% oxygen, about 15% carbon in solid form, about 5% carbon dioxide, and the rest being general atmospheric gases.

51. The method according to claim 38, further comprising:

providing at least one pump for the continuous recirculation of the liquid through the electric arc; and pumping said liquid continually through the arc.

52. The method according to claim 38, further comprising:

providing means for the utilization of the combustible gas produced, said means including a gas stabilization tank positioned above a top level of said liquid; and processing said combustible gas through said gas stabilization tank.

53. The method according to claim 38, further comprising:

providing heat exchanger means for utilizing a heat absorbed by the liquid in its passage through the arc, said heat exchanger means being in fluid communication with the metal vessel.

54. The method according to claim 53, wherein the heat absorbed by the liquid is usable by pumping said liquid through an external radiator in fluid communication with the metal vessel.

55. The method according to claim 53, wherein the heat absorbed by the liquid is usable by pumping said liquid through one of an external and internal heat exchanger in fluid communication with the metal vessel.

56. The method according to claim 53, wherein the heat absorbed is usable for the desalinization of sea water via evaporation means in fluid communication with the metal vessel.

57. The method according to claim 38, wherein the combustible gas is immetted into a stabilization tank positioned on a top of the metal vessel having an opening for mutual communication between the stabilization tank and the metal vessel, so as to permit the settling down of the liquid trapped in the combustible gas and its return to the metal vessel.

58. The method according to claim 38, further comprising:
 providing gas filter means in fluid communication with the metal vessel for filtering and removing solid and liquid particulates in the combustible gas prior to its release for use; and
 filtering said gas thereby removing the solid and liquid particulates prior to its release for use.

59. The method according to claim 38, further comprising:
 providing a degaussing station in fluid communication with the metal vessel for further processing of said liquid after said liquid passes through the electric arc; and
 directing the liquid through the degaussing station.

60. The method according to claim 38, further comprising:
 providing a centrifuge in fluid communication with the metal vessel for the removal of solid components in the recycled liquid; and
 removing said solid components in the recycled liquid by directing the liquid through the centrifuge.

61. The method according to claim 38, wherein the arc is created by a continuous current.

62. The method according to claim 38, wherein the arc is created by an alternating current.

* * * * *